United States Patent
Bhasin et al.

(10) Patent No.: US 7,373,472 B2
(45) Date of Patent: May 13, 2008

(54) STORAGE SWITCH ASYNCHRONOUS REPLICATION

(75) Inventors: Harinder Pal Singh Bhasin, Danville, CA (US); Ambrish Verma, Seattle, WA (US); Poulo Kuriakose, Cupertino, CA (US); Rajesh Ananthanarayanan, San Jose, CA (US)

(73) Assignee: EMC Corporation, Hokinton, MA (US)

( * ) Notice: Subject to any disclaimer, the term of this patent is extended or adjusted under 35 U.S.C. 154(b) by 485 days.

(21) Appl. No.: 10/932,365

(22) Filed: Aug. 31, 2004

(65) Prior Publication Data

US 2006/0047928 A1 Mar. 2, 2006

(51) Int. Cl.
*G06F 12/08* (2006.01)

(52) U.S. Cl. .................. 711/170; 710/316; 711/162; 707/204

(58) Field of Classification Search .............. None
See application file for complete search history.

(56) References Cited

U.S. PATENT DOCUMENTS

| | | | |
|---|---|---|---|
| 6,886,086 B2 * | 4/2005 | Kobayashi et al. ......... 711/162 |
| 6,961,812 B2 * | 11/2005 | Bjork et al. ................. 711/112 |
| 6,993,635 B1 * | 1/2006 | Gazit et al. .................. 711/162 |
| 7,152,078 B2 * | 12/2006 | Yamagami ................... 711/162 |
| 7,155,465 B2 * | 12/2006 | Lee et al. .................... 707/204 |
| 7,188,222 B2 * | 3/2007 | Micka et al. ................ 711/162 |

* cited by examiner

*Primary Examiner*—Gary Portka
(74) *Attorney, Agent, or Firm*—Barry N. Young

(57) ABSTRACT

Systems and methods in accordance with embodiments are provided for the replication of data from virtual logical units to remote virtual logical units. Change logs can be provided at a primary storage switch including a primary VLU to indicate changes made to the primary VLU between replications. The change log can also be used to resynchronize a member split from the primary VLU during a replication operation. Members can be split from the primary VLU and used in a split virtual logical unit at the primary VLU for replication. The remaining member(s) of the primary VLU can be used to maintain the primary VLU online for host devices during the replication operation. A remote VLU at a remote storage switch can be exported as a physical logical unit to the primary storage switch where it is provisioned for a member of a replication VLU at the primary storage switch.

40 Claims, 29 Drawing Sheets

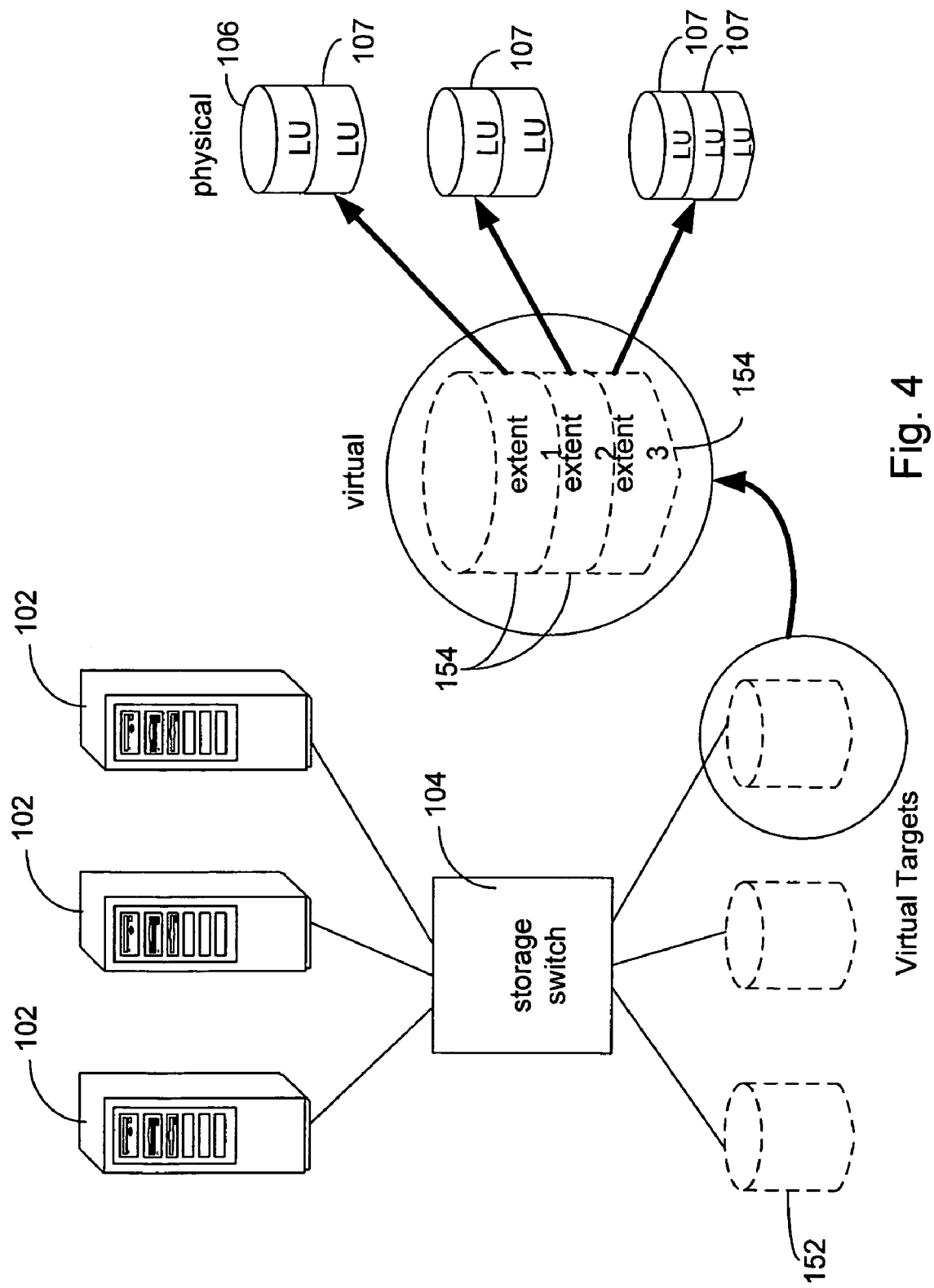

(Classification - PACE -
iSCSI - ingress)

(Classification - PACE -
iSCSI - egress)

(classification - PACE -
FCP - ingress)

(classification - PACE -
FCP - egress)

(Classification - PPU - ingress)

(Classification - PPU - egress)

(Virtualization Ingress - cmd)

(Virtualization - Egress - cmd)

(Virtualization - Ingress - R2T/XFR_RDY)

(Virtualization - Egress - R2T/XFR_RDY)

(Virtualization - Ingress -
write data packet)

(Virtualization - Egress - write data pkt)

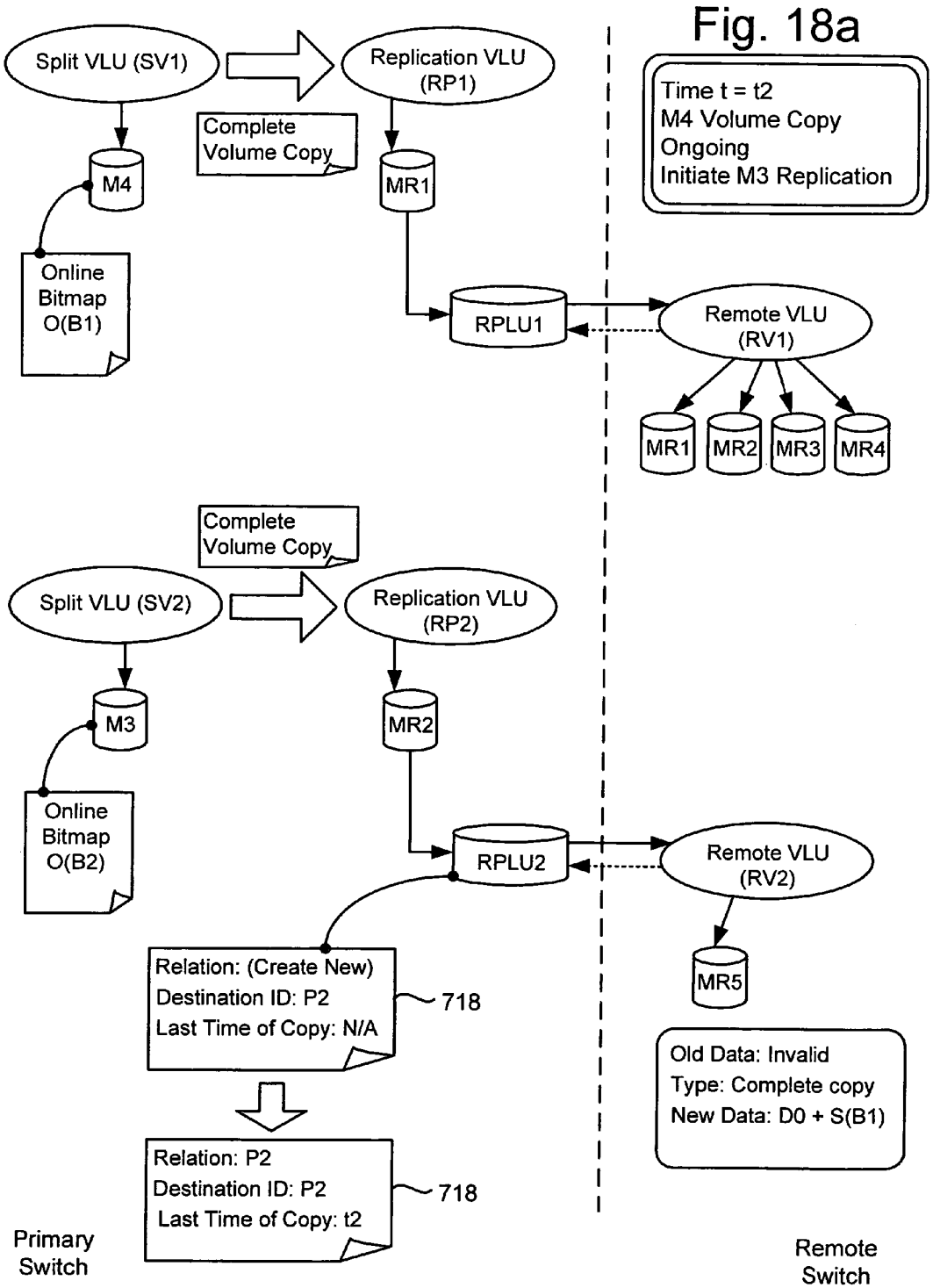

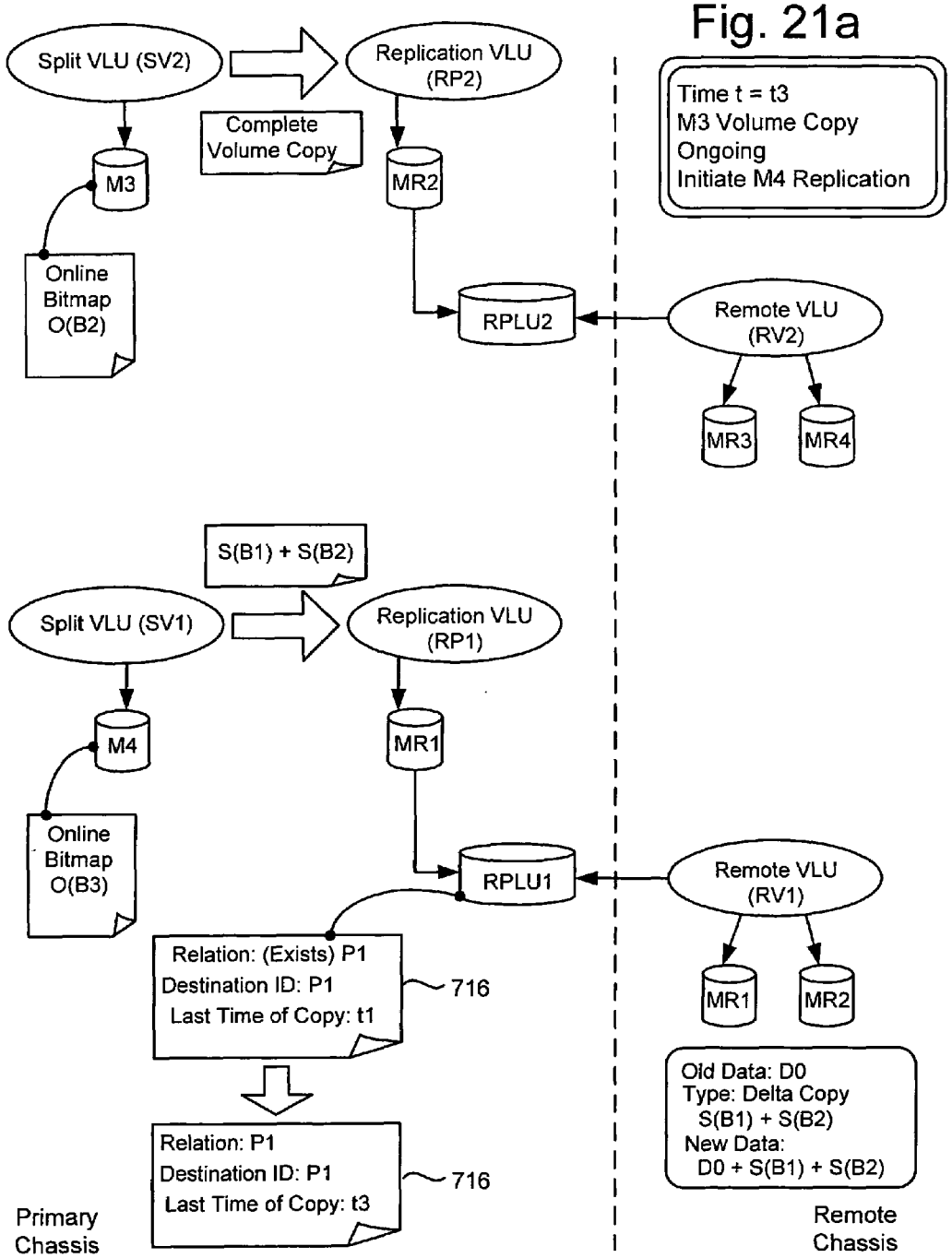

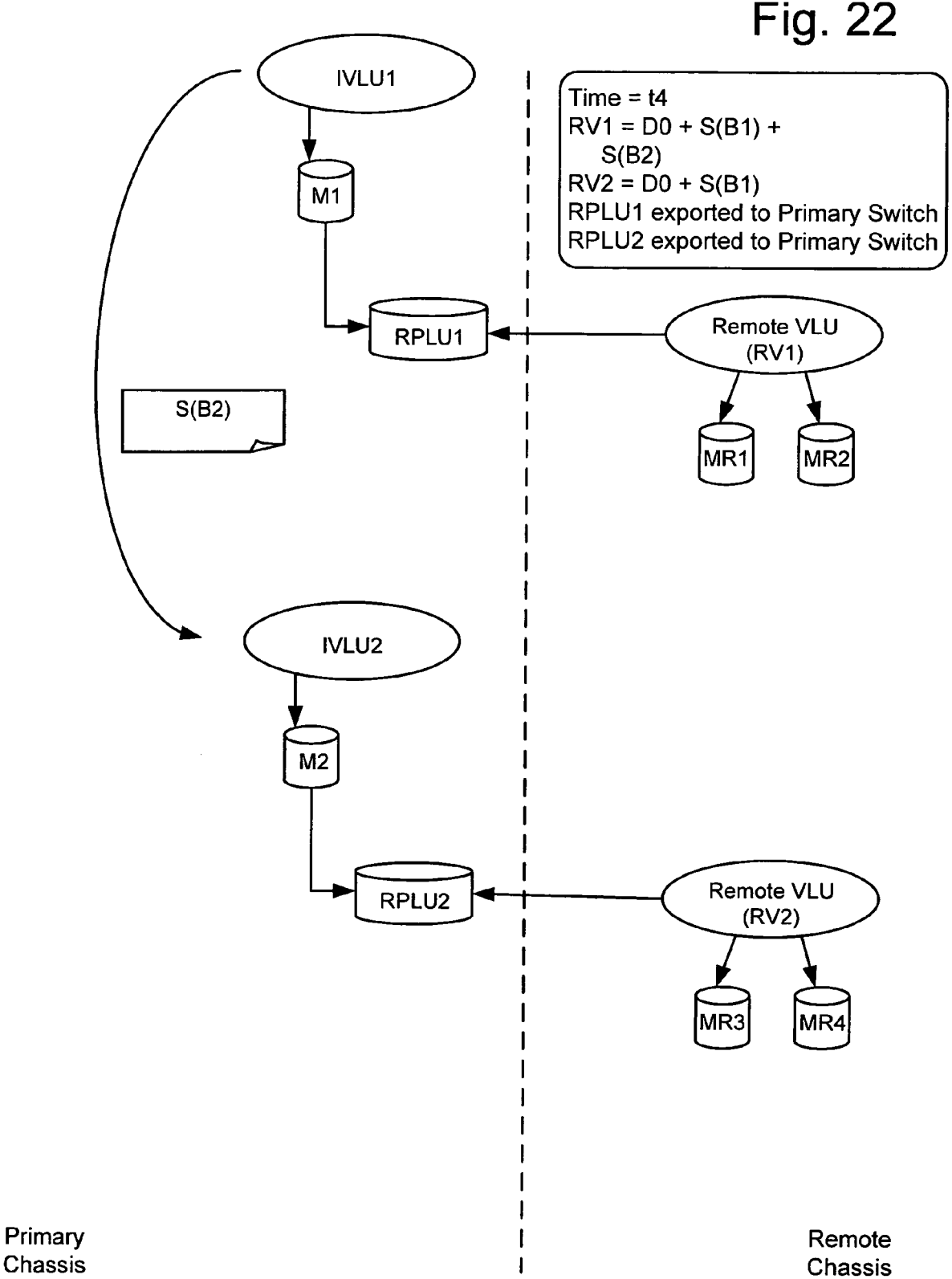

STORAGE SWITCH ASYNCHRONOUS REPLICATION

CROSS-REFERENCE TO RELATED APPLICATIONS

The following applications are cross-referenced and incorporated by reference herein in their entirety:

U.S. patent application Ser. No. 10/833,438, entitled PROACTIVE TRANSFER READY RESOURCE MANAGEMENT IN STORAGE AREA NETWORKS, filed Apr. 28, 2004;

U.S. patent application Ser. No. 10/837,248, entitled ONLINE INITIAL MIRROR SYNCHRONIZATION AND MIRROR SYNCHRONIZATION VERIFICATION IN STORAGE AREA NETWORKS, filed Apr. 30, 2004;

U.S. patent application Ser. No. 10/051,321, entitled STORAGE SWITCH FOR STORAGE AREA NETWORK, filed Jan. 18, 2002;

U.S. patent application Ser. No. 10/051,396, entitled VIRTUALIZATION IN A STORAGE SYSTEM, filed Jan. 18, 2002; and U.S. patent application Ser. No. 10/050,974, entitled POOLING AND PROVISIONING STORAGE RESOURCES IN A STORAGE NETWORK, filed Jan. 18, 2002, now U.S. Pat. No. 6,976,134, issued Dec. 13, 2005.

BACKGROUND OF THE INVENTION

1. Field of the Invention

The present invention relates generally to storage area networks.

2. Description of the Related Art

The management of information is becoming an increasingly daunting task in today's environment of data intensive industries and applications. More particularly, the management of raw data storage is becoming more cumbersome and difficult as more companies and individuals are faced with larger and larger amounts of data that must be effectively, efficiently, and reliably maintained. Entities continue to face the necessity of adding more storage, servicing more users, and providing access to more data for larger numbers of users.

The concept of storage area networks or SANs has gained popularity in recent years to meet these increasing demands. Although various definitions of a SAN exist, a SAN can generally be considered a network whose primary purpose is the transfer of data between computer systems and storage elements and among storage elements. A SAN can form an essentially independent network that does not have the same bandwidth limitations as many of its direct-connect counterparts including storage devices connected directly to servers (e.g., with a SCSI connection) and storage devices added directly to a local area network (LAN) using traditional Ethernet interfaces, for example.

In a SAN environment, targets, which can include storage devices (e.g., tape drives and RAID arrays) and other devices capable of storing data, and initiators, which can included servers, personal computing devices, and other devices capable of providing write commands and requests, are generally interconnected via various switches and/or appliances. The connections to the switches and appliances are usually Fibre Channel.

A typical appliance may receive and store data within the appliance, then, with an internal processor for example, analyze and operate on the data in order to forward the data to the appropriate target(s). Such store-and-forward processing can slow down data access, including the times for reading data from and writing data to the storage device(s). Accordingly, switches are often used to connect initiators with appliances, given the large number of initiators and small number of ports included in many appliances. In more current SAN implementations, switches have replaced certain functionality previously preformed by appliances such that appliances are not necessary and can be eliminated from the systems.

Some storage area networks provide for replicating data from a first storage location to a second storage location. Such replication includes either a synchronous or asynchronous implementation and is typically performed under the control of a host device such as a server or under the control of a storage subsystem. Synchronous based replication by a host device is performed at the application or file level such that each write by the host device to a volume is simultaneously broadcast or replicated to both a primary and secondary location. Synchronous replication can have deleterious effects on application performance because applications must wait for an indication that a write has been successfully completed at each location before proceeding. While host based asynchronous replication can be performed at distinct points in time from writing the initial data to the primary location, it also presents problems. Asynchronous replication is typically performed at the application or file level as with host based synchronous replication. Accordingly, precise logic must be implemented to maintain consistency such as proper order of access requests to the replicating volume. Furthermore, host based asynchronous replication generally involves buffering the replicated data in the host device after reading it from a source and before providing it to a destination. Buffering the data increases replication time and consequently degrades system performance.

Accordingly, there is a need for techniques and systems in storage area networks to address these identified deficiencies and provide for switch-based replication that is both efficient and reliable.

SUMMARY OF THE INVENTION

In accordance with embodiments, systems and methods are provided to manage and replicate virtual targets for increased availability and reliability of data.

In accordance with one embodiment, a primary virtual logical unit (VLU) is provisioned at a primary storage switch. The VLU is replicated to a remote location, such as a remote virtual logical unit at a remote storage switch, to provide a redundant and remote copy of the data. In accordance with one embodiment, a change log such as a bitmap is maintained at the primary storage switch to provide an indication of changes to the primary VLU relative to the last replication of the primary VLU to the remote VLU. In this manner, a subsequent replication need only include copying that data from the primary VLU indicated as being changed since the last replication. In this manner, more efficient replication of a VLU to a remote location can be achieved.

In one embodiment, for example, a storage switch is provided that includes at least one virtual logical unit configuration including a plurality of blocks and at least one change log indicating changes to the plurality of blocks since a last replication of the at least one virtual logical unit configuration to a remote location. The change log, in one embodiment, can be a bitmap including a plurality of bits each representing a corresponding group of blocks of the at least one virtual logical unit configuration. The state of a bit is changed if any of the underlying data at the represented group of blocks is changed since the last replication to the remote VLU. In one embodiment, the at least one virtual logical unit configuration can include at least one member and the at least one change log include a first change log that indicates changes to the plurality of blocks since a last time the at least one member was split from the at least one virtual logical unit configuration. This change log can not only be used during a subsequent replication to update only that information that has changed, but can also be used when the split member is rejoined to the primary VLU in order to synchronize the data of the split member with that of the primary VLU.

In one embodiment, a method of replicating virtual targets is provided that includes providing a change log at a storage switch to indicate changes to a first virtual logical unit configuration having a plurality of blocks and replicating data from the first virtual logical unit configuration to a remote virtual logical unit configuration using the change log. The first virtual logical unit configuration can include at least one member and the method include splitting a first member from the first virtual logical unit configuration and creating a split virtual logical unit configuration including the first member. The step of providing a change log can include creating the change log when the first member is split such that it indicates changes to the first virtual logical unit configuration after splitting the first member. Again, this change log can be used during a subsequent replication to update the remote virtual logical unit configuration with only that portion of the first virtual logical unit configuration that has changed since the ongoing replication.

In another embodiment, a storage switch is provided that includes at least one first virtual logical unit configuration including at least one member, a split virtual logical unit configuration including the at least one member when split from the at least one first virtual logical unit configuration, and a replication virtual logical unit configuration including a member corresponding to a first physical logical unit configuration imported from a remote storage switch. The first physical logical unit configuration can correspond to a remote virtual logical unit configuration at the remote storage switch. The at least one virtual logical unit configuration can be replicated to the remote virtual logical unit configuration by copying data from the split virtual logical unit configuration to the replication virtual logical unit configuration. A change log can be used in accordance with such a storage switch to limit copying to that data that has changed or that is included in a group having changed data.

In one embodiment, a method of replicating virtual targets is provided that includes splitting a first member from a first virtual logical unit configuration, creating a split virtual logical unit configuration including the first member, importing a physical logical unit configuration corresponding to a remote virtual logical unit configuration, and creating a replication virtual logical unit configuration including a member corresponding to the physical logical unit configuration. The method can further include copying data from the split virtual logical unit configuration to the replication virtual logical unit configuration. This step of copying can include copying selected data from the split virtual logical unit configuration in accordance with a change log indicating changes to the first virtual logical unit configuration since a last replication to the remote virtual logical unit configuration.

In accordance with embodiments, multiple distinct point in time replications of data can be maintained. Multiple remote virtual logical units can be established and each contain a copy of the data in a primary virtual logical unit at different moments in time. The replication to multiple remote units can overlap such that a second point time in replication begins before completion of a first point in time replication.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, software implementing the present invention is used to program one or more processors. The one or more processors can be in communication with one or more storage devices (hard disk drives, CD-ROMs, DVDs, optical disks, floppy disks, tape drives, RAM, ROM, flash memory or other suitable storage devices), peripherals (printers, monitors, keyboards, pointing devices) and/or communication interfaces (e.g. network cards, wireless transmitters/receivers, etc.).

Other features, aspects, and objects of the invention can be obtained from a review of the specification, the figures, and the claims.

BRIEF DESCRIPTION OF THE DRAWINGS

FIG. 4 is a generalized functional block diagram illustrating virtual targets as can be seen by an initiating device;

FIG. 18a is a block diagram of select components of a storage area network depicting a replication operation in accordance with one embodiment;

FIG. 21a is a block diagram of select components of a storage area network depicting a replication operation in accordance with one embodiment;

FIG. 22 is a flowchart depicting a synchronization operation between two remote virtual logical units.

DETAILED DESCRIPTION

Figure 1:
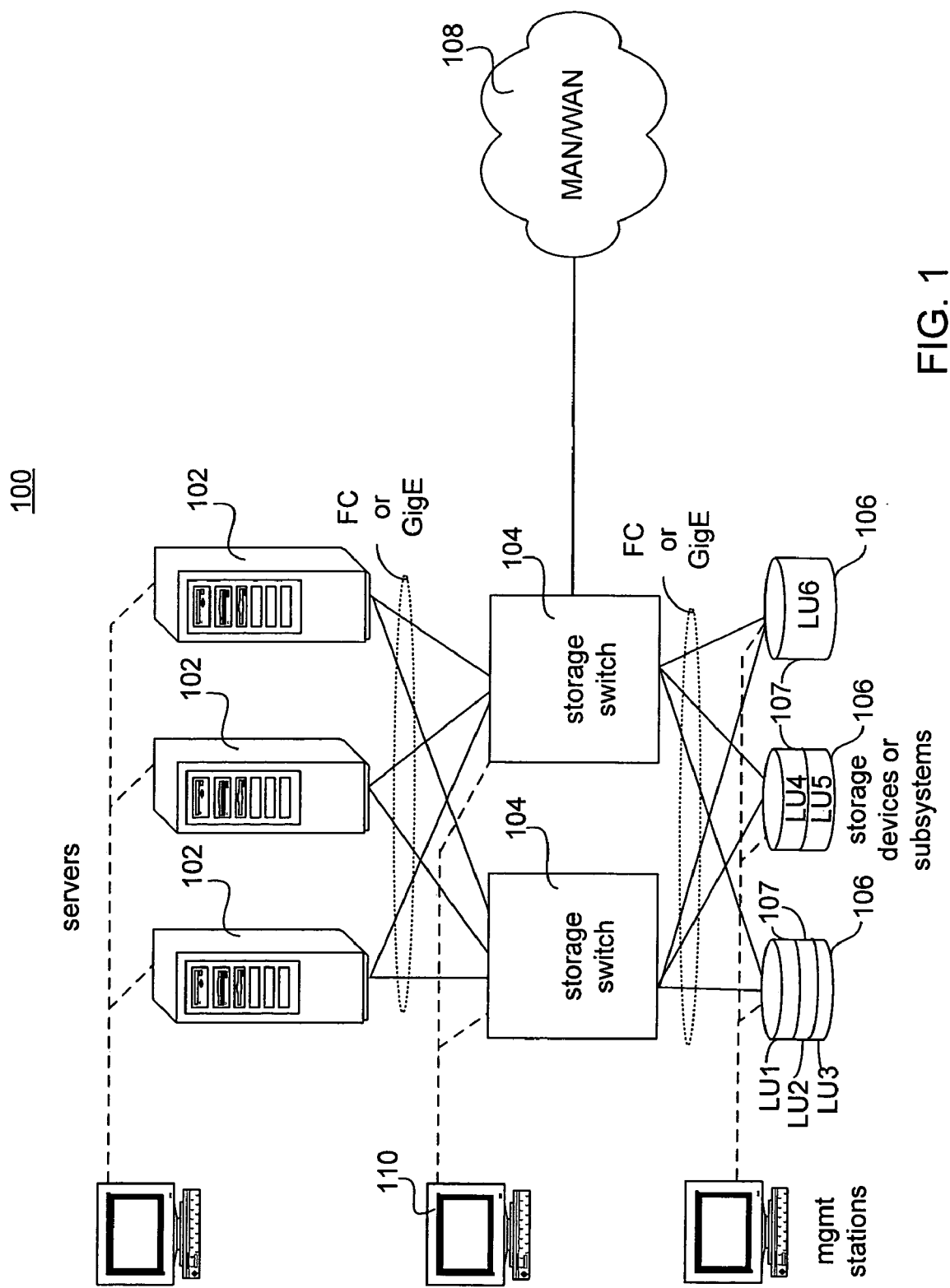
FIG. 1 is a generalized functional block diagram of a storage area network in accordance with one embodiment.

An exemplary system 100 including a storage switch that can be used in accordance with various embodiments is illustrated in FIG. 1. System 100 can include a plurality of initiating devices such as servers 102. It will be appreciated that more or fewer servers can be used and that embodiments can include any suitable physical initiator in addition to or in place of servers 102. Although not shown, the servers could also be coupled to a LAN. As shown, each server 102 is connected to a storage switch 104. In other embodiments, however, each server 102 may be connected to fewer than all of the storage switches 104 present. The connections formed between the servers and switches can utilize any protocol, although in one embodiment the connections are Fibre Channel or Gigabit Ethernet (carrying packets in accordance with the iSCSI protocol). Other embodiments may use the Infiniband protocol, defined by the Infiniband Trade Association, or other protocols or connections.

In some embodiments, one or more switches 104 are each coupled to a Metropolitan Area Network (MAN) or Wide Area Network (WAN) 108, such as the Internet. The connection formed between a storage switch 104 and a WAN 108 will generally use the Internet Protocol (IP) in most embodiments. Although shown as directly connected to MAN/WAN 108, other embodiments may utilize a router (not shown) as an intermediary between switch 104 and MAN/WAN 108.

In addition, respective management stations 110 are connected to each storage switch 104, to each server 102, and to each storage device 106. Although management stations are illustrated as distinct computers, it is to be understood that the software to manage each type of device could collectively be on a single computer.

Such a storage switch 104, in addition to its switching function, can provide virtualization and storage services (e.g., mirroring). Such services can include those that would typically be provided by appliances in conventional architectures.

In addition, the intelligence of a storage switch in accordance with an embodiment of the invention is distributed to every switch port. This distributed intelligence allows for system scalability and availability. The distributed intelligence allows a switch in accordance with an embodiment to process data at "wire speed," meaning that a storage switch 104 introduces no more latency to a data packet than would be introduced by a typical network switch. Thus, "wire speed" for the switch is measured by the connection to the particular port. Accordingly, in one embodiment having OC-48 connections, the storage switch can keep up with an OC-48 speed (2.5 bits per ns). A two Kilobyte packet (with 10 bits per byte) moving at OC-48 speed can take as little as eight microseconds coming into the switch. A one Kilobyte packet can take as little as four microseconds. A minimum packet of 100 bytes can only elapse a mere 400 ns.

More information on various storage area networks, including a network as illustrated in FIG. 1 can be found in U.S. patent application Ser. No. 10/051,396, entitled VIRTUALIZATION IN A STORAGE SYSTEM, filed Jan. 18, 2002 and U.S. patent application Ser. No. 10/051,321, entitled STORAGE SWITCH FOR STORAGE AREA NETWORK, filed Jan. 18, 2002.

"Virtualization" generally refers to the mapping of a virtual target space subscribed to by a user to a space on one or more physical storage target devices. The terms "virtual" and "virtual target"(or "virtual logical unit") come from the fact that storage space allocated per subscription can be anywhere on one or more physical storage target devices connecting to a storage switch 104. The physical space can be provisioned as a "virtual target" or "virtual logical unit (VLU)" which may include one or more "logical units" (LUs). Each virtual target consists of one or more LUs identified with one or more LU numbers (LUNs), which are frequently used in the iSCSI and FC protocols. Each logical unit is generally comprised of one or more extents—a contiguous slice of storage space on a physical device. Thus, a virtual target or VLU may occupy a whole storage device (one extent), a part of a single storage device (one or more extents), or parts of multiple storage devices (multiple extents). The physical devices, the LUs, the number of extents, and their exact locations are immaterial and invisible to a subscriber user.

Storage space may come from a number of different physical devices, with each virtual target belonging to one or more "pools" in various embodiments, sometimes referred to herein as "domains." Only users of the same domain are allowed to share the virtual targets in their domain in one embodiment. Domain-sets can also be formed that include several domains as members. Use of domain-sets can ease the management of users of multiple domains, e.g., if one company has five domains but elects to discontinue service, only one action need be taken to disable the domain-set as a whole. The members of a domain-set can be members of other domains as well.

Figure 2:
FIG. 2 is a generalized functional block diagram of a storage switch in accordance with one embodiment.

FIG. 2 illustrates a functional block diagram of a storage switch 104 in accordance with an embodiment of the invention. More information regarding the details of a storage switch such as storage switch 104 and its operation can be found in U.S. patent application Ser. No. 10/051,321, entitled STORAGE SWITCH FOR STORAGE AREA NETWORK, filed Jan. 18, 2002. In one embodiment, the storage switch 104 includes a plurality of linecards 202, 204, and 206, a plurality of fabric cards 208, and two system control cards 210, each of which will be described in further detail below. Although an exemplary storage switch is illustrated, it will be appreciated that numerous other implementations and configurations can be used in accordance with various embodiments.

System Control Cards. Each of the two System Control Cards (SCCs) 210 connects to every line card 202, 204, 206. In one embodiment, such connections are formed by $I^2C$ signals, which are well known in the art, and through an Ethernet connection with the SCC. The SCC controls power up and monitors individual linecards, as well as the fabric cards, with the $I^2C$ connections. Using inter-card communication over the Ethernet connections, the SCC also initiates various storage services, e.g., snapshot and replicate.

In addition, the SCC maintains a database 212 that tracks configuration information for the storage switch as well as all virtual targets and physical devices attached to the switch, e.g., servers and storage devices. Database 212 can be maintained in flash or some other non-volatile memory 211 at the SCC. In addition, the database keeps information regarding usage, error and access data, as well as information regarding different domains and domain sets of virtual targets and users. The records of the database may be referred to herein as "objects." Each initiator (e.g., a server) and target (e.g., a storage device) has a World Wide Unique Identifier (WWUI), which are known in the art. The database is maintained in a memory device within the SCC, which in one embodiment is formed from flash memory, although other memory devices can be used in various embodiments.

The storage switch 104 can be reached by a management station 110 through the SCC 210 using an Ethernet connection. Accordingly, the SCC also includes an additional Ethernet port for connection to a management station. An administrator at the management station can discover the addition or removal of storage devices or virtual targets, as well as query and update virtually any object stored in the SCC database 212.

Fabric Cards. In one embodiment of switch 104, there are three fabric cards 208, although other embodiments could have more or fewer fabric cards. Each fabric card 208 is coupled to each of the linecards 202, 204, 206 in one embodiment and serves to connect all of the linecards together. In one embodiment, the fabric cards 208 can each handle maximum traffic when all linecards are populated. Such traffic loads handled by each linecard are up to 160 Gbps in one embodiment although other embodiments could handle higher or lower maximum traffic volumes. If one fabric card 208 fails, the two surviving cards still have enough bandwidth for the maximum possible switch traffic: in one embodiment, each linecard generates 20 Gbps of traffic, 10 Gbps ingress and 10 Gbps egress. However, under normal circumstances, all three fabric cards are active at the same time. From each linecard, the data traffic is sent to any one of the three fabric cards that can accommodate the data.

Linecards. The linecards form connections to servers and to storage devices. In one embodiment, storage switch 104 supports up to sixteen linecards although other embodiments could support a different number. Further, in one embodiment, three different types of linecards are utilized: Gigabit Ethernet (GigE) cards 202, Fibre Channel (FC) cards 204, and WAN cards 206. Other embodiments may include more or fewer types of linecards. The GigE cards 202 are for Ethernet connections, connecting in one embodiment to either iSCSI servers or iSCSI storage devices (or other Ethernet based devices). The FC cards 204 are for Fibre Channel connections, connecting to either Fibre Channel Protocol (FCP) servers or FCP storage devices. The WAN cards 206 are for connecting to a MAN or WAN.

Figure 3:
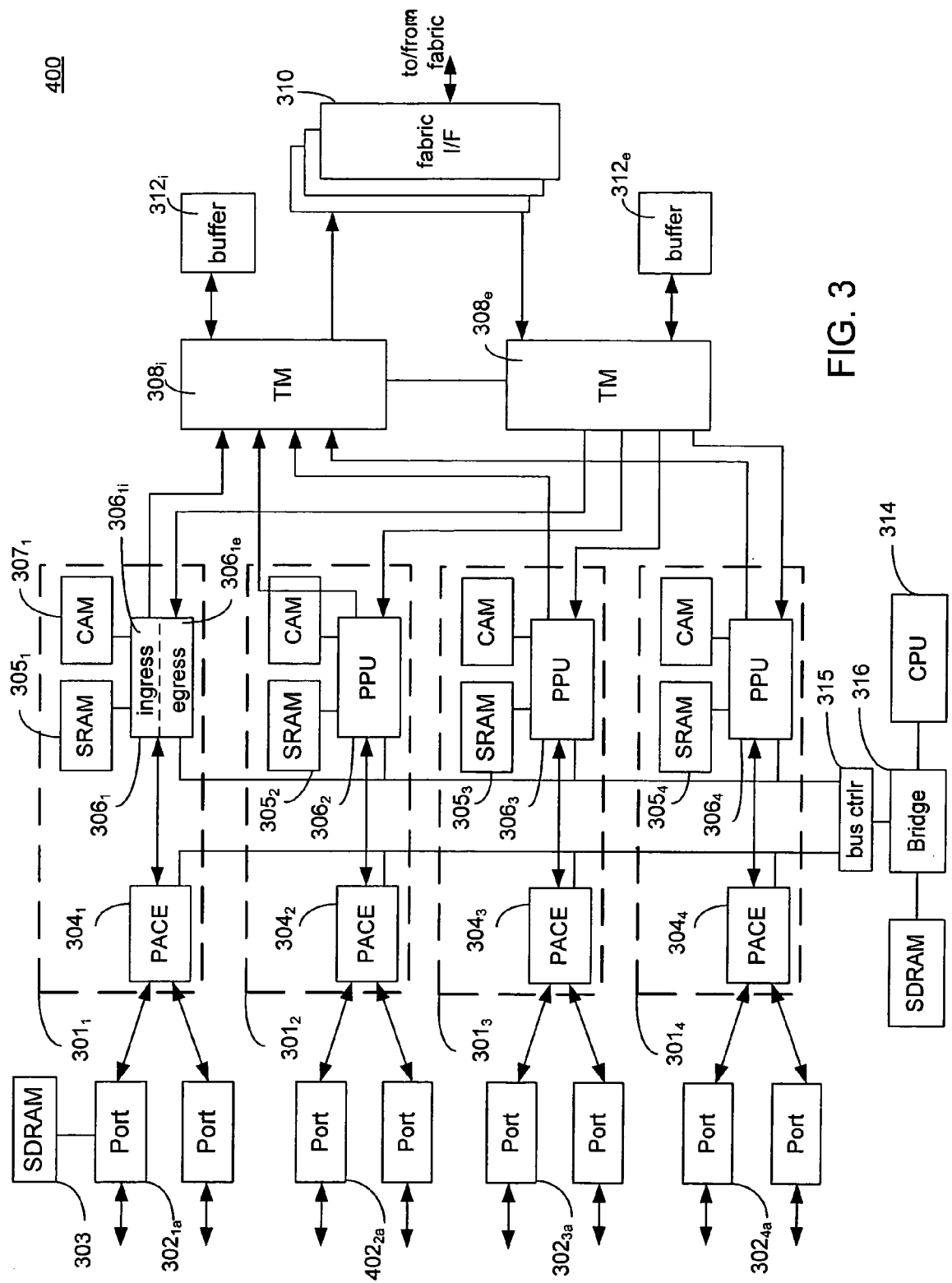
FIG. 3 is a generalized functional block diagram of a linecard used in a storage switch in accordance with one embodiment.

FIG. 3 illustrates a functional block diagram of a generic line card 300 used in a storage switch 104 in accordance with one embodiment. Line card 300 is presented for exemplary purposes only. Other line cards and designs can be used in accordance with embodiments. The illustration shows those components that are common among all types of linecards, e.g., GigE 302, FC 304, or WAN 306. In other embodiments other types of linecards can be utilized to connect to devices using other protocols, such as Infiniband.

Ports. Each line card 300 includes a plurality of ports 302. The ports form the linecard's connections to either servers or storage devices. Eight ports are shown in the embodiment illustrated, but more or fewer could be used in other embodiments. For example, in one embodiment each GigE card can support up to eight 1 Gb Ethernet ports, each FC card can support up to either eight 1 Gb FC ports or four 2 Gb FC ports, and each WAN card can support up to four OC-48 ports or two OC-192 ports. Thus, in one embodiment, the maximum possible connections are 128 ports per switch 104. The ports of each linecard are full duplex in one embodiment, and connect to either a server or other client, and/or to a storage device or subsystem.

In addition, each port 302 has an associated memory 303. Although only one memory device is shown connected to one port, it is to be understood that each port may have its own memory device or the ports may all be coupled to a single memory device. Only one memory device is shown here coupled to one port for clarity of illustration.

Storage Processor Unit. In one embodiment, each port is associated with a Storage Processor Unit (SPU) 301. In one embodiment the SPU rapidly processes the data traffic allowing for wire-speed operations. In one embodiment, each SPU includes several elements: a Packet Aggregation and Classification Engine (PACE) 304, a Packet Processing Unit (PPU) 306, an SRAM 305, and a CAM 307. Still other embodiments may use more or fewer elements or could combine elements to obtain the same functionality. For instance, some embodiments may include a PACE and a PPU in the SPU, but the SPU may share memory elements with other SPUs.

PACE. Each port is coupled to a Packet Aggregation and Classification Engine (PACE) 304. As illustrated, the PACE 304 aggregates two ports into a single data channel having twice the bandwidth. For instance, the PACE 304 aggregates two 1 Gb ports into a single 2 Gb data channel. The PACE can classify each received packet into a control packet or a data packet. Control packets are sent to the CPU 314 for processing, via bridge 316. Data packets are sent to a Packet Processing Unit (PPU) 306, discussed below, with a local header added. In one embodiment the local header is sixteen bytes resulting in a data "cell" of 64 bytes (16 bytes of header and 48 bytes of payload). The local header is used to carry information and used internally by switch 104. The local header is removed before the packet leaves the switch. Accordingly, a "cell" can be a transport unit used locally in the switch that includes a local header and the original packet (in some embodiments, the original TCP/IP headers are also stripped from the original packet). Nonetheless, not all embodiments of the invention will create a local header or have "internal packets" (cells) that differ from external packets. Accordingly, the term "packet" as used herein can refer to either "internal" or "external" packets.

The classification function helps to enable a switch to perform storage virtualization and protocol translation functions at wire speed without using a store-and-forward model of conventional systems. Each PACE has a dedicated path to a PPU, e.g. PPU $306_1$, while all four PACEs in the illustrated embodiment share a path to the CPU 314, which in one embodiment is a 104 MHz/32(3.2 Gbps) bit data path.

Packet Processing Unit (PPU). Each PPU such as PPU $306_1$, performs virtualization and protocol translation on-the-fly, meaning that cells are not buffered for such processing. It also implements other switch-based storage service functions, described later. The PPU is capable, in one embodiment, of moving cells at OC-48 speed or 2.5 Gbps for both the ingress and egress directions, while in other embodiments it can move cells at OC-192 speeds or 10 Gbps. The PPU in one embodiment includes an ingress PPU $306_{1i}$ and an egress PPU $306_{1e}$, which both run concurrently. The ingress PPU $306_{1i}$ receives incoming data from PACE $304_1$, and sends data to the Traffic Manager $308_i$ while the egress PPU $306_{1e}$, receives data from Traffic Manager $308_e$ and sends data to a PACE $304_1$. Although only one PPU $306_1$ is shown in FIG. 3 as having an ingress PPU $306_{1i}$ and an egress PPU $306_{1e}$, it is to be understood that in one embodiment all PPUs 306 will include both an ingress and an egress PPU and that only one PPU is shown in FIG. 3 with both ingress and egress PPUs for clarity of illustration.

A large number of storage connections (e.g., server to virtual target) can be established concurrently at each port. Nonetheless, each connection is unique to a virtual target and can be uniquely identified by a TCP Control Block Index (in the case of iSCSI connections) and a port number. When a connection is established, the CPU 314 of the linecard 300 informs a PPU 306 of an active virtual target by sending it a Virtual Target Descriptor (VTD) for the connection. The VTD includes all relevant information regarding the connection and virtual target that the PPU will need to properly operate on the data, e.g., perform virtualization, translation, and various storage services. The VTD is derived from an object in the SCC database and usually contains a subset of information that is stored in the associated object in the SCC database.

Similarly, Physical Target Descriptors (PTDs) are utilized in an embodiment of the invention. PTDs describe the actual physical devices, their individual LUs, or their individual extents (a contiguous part of or whole LU) and will include information similar to that for the VTD. Also, like the VTD, the PTD is derived from an object in the SCC database.

To store the VTDs and PTDs and have quick access to them, in one embodiment the PPUs such as PPU $306_1$ are connected to an SRAM $305_1$, and CAM $307_1$. SRAM $305_1$ can store a VTD and PTD database. A listing of VTD Identifiers (VTD IDs), or addresses, as well as PTD Identifiers (PTD IDs), is also maintained in the PPU CAM $307_1$ for quick accessing of the VTDs. The VTD IDs are indexed (mapped) using a TCP Control Block Index and a LUN. The PTD IDs are indexed using a VTD ID. In addition, for IP routing services, the CAM $307_1$ contains a route table, which is updated by the CPU when routes are added or removed.

In various embodiments, each PPU will be connected with its own CAM and SRAM device as illustrated, or the PPUs will all be connected to a single CAM and/or SRAM (not illustrated).

For each outstanding request to the PPU (e.g., reads or writes), a task control block is established in the PPU SRAM 307 to track the status of the request. There are ingress task control blocks (ITCBs) tracking the status of requests received by the storage switch on the ingress PPU and egress task control blocks (ETCBs) tracking the status of requests sent out by the storage switch on the egress PPU. For each virtual target connection, there can be a large number of concurrent requests, and thus many task control blocks. Task control blocks are allocated as a request begins and freed as the request completes.

Traffic Manager. There are two traffic managers (TMs) 308 on each linecard 300: one TM $308_i$ for ingress traffic and one TM $308_e$ for egress traffic. The ingress TM receives cells from all four SPUs, in the form of 64-byte data cells, in one embodiment. In such an embodiment, each data cell has 16 bytes of local header and 48 bytes of payload. The header contains a Flow ID that tells the TM the destination port of the cell. In some embodiments, the SPU may also attach a TM header to the cell prior to forwarding the cell to the TM. Either the TM or the SPU can also subdivide the cell into smaller cells for transmission through the fabric cards in some embodiments.

The ingress TM sends data cells to the fabric cards via a 128-bit 104 Mhz interface 310 in one embodiment. Other embodiments may operate at 125 Mhz or other speeds. The egress TM receives the data cells from the fabric cards and delivers them to the four SPUs.

Both ingress and egress TMs have a large buffer 312 to queue cells for delivery. Both buffers 312 for the ingress and egress TMs are 64 MB, which can queue a large number of packets for internal flow control within the switch. The cells are not buffered as in cached or buffered switch implementations. There is no transport level acknowledgement as in these systems. The cells are only temporarily buffered to maintain flow control within the switch. The cells maintain their original order and there is no level high level processing of the cells at the TM The SPUs can normally send cells to the ingress TM quickly as the outgoing flow of the fabric cards is as fast as the incoming flow. Hence, the cells are moving to the egress TM quickly. On the other hand, an egress TM may be backed up because the outgoing port is jammed or being fed by multiple ingress linecards. In such a case, a flag is set in the header of the outgoing cells to inform the egress SPU to take actions quickly. The egress TM also sends a request to the ingress SPU to activate a flow control function used in providing Quality of Service for Storage access. It is worth noting that, unlike communications traffic over the Internet, for storage traffic dropping a packet or cell is unacceptable. Therefore, as soon as the amount of cells in the buffer exceeds a specified threshold, the SPU can activate its flow control function to slow down the incoming traffic to avoid buffer overflow.

Fabric Connection. The fabric connection 310 converts the 256-bit parallel signals of the TM (128 bits ingress and 128 bits egress, respectively), into a 16-bit serial interface (8-bit ingress and 8-bit egress) to the backplane at 160 Gbps. Thus the backplane is running at one sixteenth of the pins but sixteen times faster in speed. This conversion enables the construction of a high availability backplane at a reasonable cost without thousands of connecting pins and wires. Further, because there are three fabric cards in one embodiment, there are three high-speed connectors on each linecard in one embodiment, wherein the connectors each respectively connect the 8-bit signals to a respective one of the three fabric cards. Of course, other embodiments may not require three fabric connections 310.

CPU. On every linecard there is a processor (CPU) 614, which in one embodiment is a PowerPC 750 Cxe. In one embodiment, CPU 314 connects to each PACE with a 3.2 Gb bus, via a bus controller 315 and a bridge 316. In addition, CPU 314 also connects to each PPU, CAM and TM, however, in some embodiments this connection is slower at 40 Mbps. Both the 3.2 Gb and 40 Mb paths allow the CPU to communicate with most devices in the linecard as well as to read and write the internal registers of every device on the linecard, download microcode, and send and receive control packets.

The CPU on each linecard is responsible to initialize every chip at power up and to download microcode to the SPUs and each port wherever the microcode is needed. Once the linecard is in running state, the CPU processes the control traffic. For information needed to establish a virtual target connection, the CPU requests the information from the SCC, which in turn gets the information from an appropriate object in the SCC database.

Distinction in Linecards—Ports. The ports in each type of linecard, e.g., GigE, FC, or WAN are distinct as each linecard supports one type of port in one embodiment. In other embodiments, other linecard ports could be designed to support other protocols, such as Infiniband.

GigE Port. A gigabit Ethernet port connects to iSCSI servers and storage devices. While the GigE port carries all kinds of Ethernet traffic, the only network traffic generally to be processed by a storage switch 104 at wire speed in accordance with one embodiment of the invention is an iSCSI Packet Data Unit (PDU) inside a TCP/IP packet. Nonetheless, in other embodiments packets in accordance with other protocols (like Network File System (NFS)) carried over Ethernet connections may be received at the GigE Port and processed by the SPU and/or CPU.

The GigE port receives and transmits TCP/IP segments for virtual targets or iSCSI devices. To establish a TCP connection for a virtual target, both the linecard CPU 314 and the SCC 310 are involved. When a TCP packet is received, and after initial handshaking is performed, a TCP control block is created and stored in the GigE port memory 303. A VTD is also retrieved from an object of the SCC database and stored in the CPU SDRAM 305 for the purpose of authenticating the connection and understanding the configuration of the virtual target. The TCP Control Block identifies a particular TCP session or iSCSI connection to which the packet belongs, and contains in one embodiment, TCP segment numbers, states, window size, and potentially other information about the connection. In addition, the TCP Control Block is identified by an index, referred to herein as the "TCP Control Block Index." A VTD for the connection can be created and stored in the SPU SRAM 305. The CPU creates the VTD by retrieving the VTD information stored in its SDRAM and originally obtained from the SCC database. A VTD ID is established in a list of VTD IDs in the SPU CAM 307 for quick reference to the VTD. The VTD ID is affiliated with and indexed by the TCP Control Block Index.

When the port receives iSCSI PDUs, it serves essentially as a termination point for the connection, but then the switch initiates a new connection with the target. After receiving a packet on the ingress side, the port delivers the iSCSI PDU to the PACE with a TCP Control Block Index, identifying a specific TCP connection. For a non-TCP packet or a TCP packet not containing an iSCSI PDU, the port receives and transmits the packet without acting as a termination point for the connection. Typically, the port 302 communicates with the PACE 304 that an iSCSI packet is received or sent by using a TCP Control Block Index. When the TCP Control Block Index of a packet is −1, it identifies a non-iSCSI packet.

FC Port. An FC port connects to servers and FC storage devices. The FC port appears as a fibre channel storage subsystem (i.e., a target) to the connecting servers, meaning, it presents a large pool of virtual target devices that allow the initiators (e.g., servers) to perform a Process Login (PLOGI or PRLI), as are understood in the art, to establish a connection. The FC port accepts the GID extended link services (ELSs) and returns a list of target devices available for access by that initiator (e.g., server).

When connecting to fibre channel storage devices, the port appears as a fibre channel F-port, meaning, it accepts a Fabric Login, as is known in the art, from the storage devices and provides name service functions by accepting and processing the GID requests—in other words, the port will appear as an initiator to storage devices.

In addition, an FC port can connect to another existing SAN network, appearing in such instances as a target with many LUs to the other network.

At the port initialization, the linecard CPU can go through both sending Fabric Logins, Process Logins, and GIDs as well as receive the same. The SCC supports an application to convert FC ELS's to iSNS requests and responses. As a result, the same database in the SCC keeps track of both the FC initiators (e.g., servers) and targets (e.g., storage devices) as if they were iSCSI initiators and targets.

When establishing an FC connection, unlike for a GigE port, an FC port does not need to create TCP control blocks or their equivalent; all the necessary information is available from the FC header. But, a VTD (indexed by a D_ID which identifies the destination of a frame) will still need to be established in a manner similar to that described for the GigE port.

An FC port can be configured for 1 Gb or 2 Gb. As a 1 Gb port, two ports are connected to a single PACE as illustrated in FIG. 3; but in an embodiment where it is configured as a 2 Gb port, port traffic and traffic that can be accommodated by the SPU should match to avoid congestion at the SPU. The port connects to the PACE with a POS/PHY interface in one embodiment. Each port can be configured separately, i.e. one PACE may have two 1 Gb ports and another PACE has a single 2 Gb port.

WAN Ports. In embodiments that include a WAN linecard, the WAN linecard supports OC-48 and OC-192 connections in one embodiment. Accordingly, there are two types of WAN ports: OC-48 and OC-192. For OC-48, there is one port for each SPU. There is no aggregation function in the PACE, although there still is the classification function. A WAN port connects to SONET and works like a GigE port as it transmits and receives network packets such as ICMP, RIP, BPG, IP and TCP. A WAN port in one embodiment supports network security with VPN and IPSec that requires additional hardware components.

Since OC-192 results in a faster wire speed, a faster SPU will be required in embodiments that support OC-192.

Switch-Based Storage Operations

One of ordinary skill in the art will have a general knowledge of the iSCSI and FC protocols. However, for more information on iSCSI refer to "draft-ietf-ips-iSCSI-20.txt," an Internet Draft (see www.ietf.org) and work in progress by the Internet Engineering Task Force (IETF), Jan. 19, 2003, incorporated herein by reference in its entirety. For more information about Fibre Channel (FC) refer to "SCSI Fibre Channel Protocol-2 (FCP-2)", Nov. 23, 2002, Rev: 08 (see www.t10.org), incorporated herein by reference in its entirety. In addition, both are further described in U.S. patent application Ser. No. 10/051,321, entitled STORAGE SWITCH FOR STORAGE AREA NETWORK, filed Jan. 18, 2002.

Storage Pools

As shown in FIG. 1, in its physical configuration, a system in accordance with an embodiment of the invention includes a switch 104 coupled to one or more servers 102 and to one or more physical devices 106, i.e., storage devices or subsystems. Each physical target is comprised of one or more logical units (LUs) 107. It is from these LUs that virtual targets or VLUs will ultimately be formed.

Before a virtual target can be created, or "provisioned," the switch needs to be "aware" of the physical storage devices attached and/or available for access by it as well as the characteristics of those physical storage devices. Accordingly, in one embodiment of the invention, when a storage device or an initiator device is connected to or registered with the switch, the switch must learn about the performance characteristics of the new device. Once a device is "discovered," various inquiries are sent to the device to gather information regarding performance characteristics. For instance, read/write commands can be sent to measure transfer rate or to check access time. Alternatively, in some embodiments, the obtaining of performance characteristics can be done by having an administrator enter the performance characteristics at a management station 110, wherein the characteristics can then be provided to a switch 104.

Based on the information gathered about the device, all of which is generally invisible to the end user, in one embodiment of the invention the switch classifies the device based on a policy. Once a policy has been determined for a storage device, the LUs for the device are assigned to a storage pool, sometimes referred to herein as a "domain." Since each storage device is comprised of one or more LUs, all the LUs of a particular storage device are assigned to the same pool. However, in one embodiment, each LU is considered by the switch as a separate storage node and each LU is described by an LU object in the SCC database. Thus, each pool has as members the LUs. In one embodiment, assignment to a pool is done independent of the protocol under which the physical storage device operates, e.g., iSCSI or Fiber Channel. As will be understood by those of skill in the art, each pool is defined in a switch by a listing for the pool of the LUs assigned to it, which listing is stored in the SCC database in one embodiment. Such a listing may be comprised of pointers to the LU objects.

Generally each pool will be accessible only to users with particular characteristics. For example, a storage pool may be established for those users located in a Building 1, where the pool is entitled "Building 1 Shared Gold Storage Pool."

Another exemplary pool may be entitled "Engineering Exclusive Silver Storage Pool" and may be exclusively accessible by the engineering team at a particular company. Of course an infinite variation of pools could be established and those described and illustrated are exemplary only.

In addition, in an embodiment, there are two special pools: a "Default Pool" and a "No Pool." A Default Pool allows access to anyone with access to the storage network. A "No Pool," in contrast, is not generally accessible to users and is only accessible to the switch itself or to the system administrator. Once assigned to a pool, the LUs can be reassigned to different pools by the switch itself or by a system administrator. For instance, an LU may initially be placed in the No Pool, tested, and then later moved to the default pool or other pool.

Provisioning a Virtual Target

Once the LUs for physical devices are in an accessible pool (i.e., not the "No Pool"), then a virtual target or VLU can be created from those LUs. Once created, as shown in FIG. 4, the servers (and their respective users) will "see" one or more virtual targets or VLUs 152, each comprised of one or more extents 154, but they will not necessarily "see" the physical devices 106. An extent is a contiguous part of or a whole LU from a physical device. As shown in the example of FIG. 4, each extent in the example virtual target 152 is formed from entire LUs from several physical devices. "Extent" may still be referenced by an LUN from an initiator, such as a server, which doesn't realize a target is "virtual." The composition of the virtual targets, including protocols used by the LU is irrelevant to the server. However, as shown in FIG. 4, each virtual target is comprised of extents that map to the LUs of physical devices 106.

To provision a virtual target, a user selects several characteristics for the virtual target in one embodiment including:

the size (e.g., in Gigabytes);
a storage pool, although in one embodiment the user may select only from the storage pools which the user is permitted to access;
desired availability, e.g., always available (data is critical and must not ever go down), usually available, etc.;
the WWUI of the virtual target;
a backup pool;
user authentication data;
number of mirrored members;
locations of mirrored numbers (e.g., local or remote).

Still in other embodiments of the invention, different, additional, or fewer characteristics can also be selected.

The switch then analyzes the available resources from the selected pool to determine if the virtual target can be formed, and in particular the switch determines if a number of LUs (or parts of LUs) to meet the size requirement for the virtual target are available. If so, the virtual target is created with one or more extents and a virtual target object is formed in the SCC database identifying the virtual target, its extents, and its characteristics. Examples of user-selected characteristics for various virtual targets can be found in U.S. patent application Ser. No. 10/051,396, entitled VIRTUALIZATION IN A STORAGE SYSTEM, filed Jan. 18, 2002

Provisioning an Initiator Connection

When a server or other initiator is connected to a switch and the initiator supports iSNS or SLP, in one embodiment the initiator will register itself with the switch, resulting in an initiator object stored in the SCC database. In other embodiments, however, the switch will include an access provisioning function which creates, updates, or deletes an initiator connection.

In creating the access connection—the connection between the switch and an initiator (such as a server)—a user will specify various parameters such as, for example, the server WWUI, connection detail, such as protocol (e.g., GigE or Fiber Channel), exclusive or shared, source and destination IP addresses, minimum and maximum percentage of bandwidth, # of connections required by the server, access security, read only or read/write, and VPN enabled, etc.

Some or all of the user specified information is saved in an initiator object stored in the SCC database. When the connection is removed, the initiator object will be deleted.

The switch, the management station, or other network management then creates a storage pool for the particular connection, specifying the LUs available to the initiator to form virtual targets.

User Domains

Like physical devices, virtual targets can be assigned to a pool accessible only to those with specified characteristics. Thus, like physical devices, virtual targets can be assigned to a user-specific domain (sometimes referred to herein as the User's Domain), a default domain (accessible to anyone), or a No Domain. Each domain will be identified, in one embodiment, by an object in the SCC database that includes a listing of all the virtual targets assigned to the domain. For virtual targets, the No Domain may include spare virtual targets, members of mirrored virtual targets, or remote virtual targets from another switch. Essentially, the virtual target No Domain is a parking place for certain types of virtual targets. For ease of description, when referring to virtual targets, pools will be referred to herein as "domains," but when referencing physical devices, pools will continue to be referred to as "pools." It is to be understood, however, that conceptually "pools" and "domains" are essentially the same thing.

Once an initiator connection is provisioned, as described above, a virtual target is provisioned that meets the initiator's requirements and placed into an accessible pool for the initiator or a previously provisioned virtual target is made accessible to the initiator, e.g., by moving the virtual target to the initiator's user domain from another domain such as the No Domain or Default Domain. (Note that either the virtual target or the initiator connection can be provisioned first—there is no requirement that they be provisioned in a particular order). Then, once an initiator requests access to the virtual target, e.g., by sending a read or write request, both the virtual target object and initiator object are read from the SCC database and information regarding the initiator connection and virtual target is passed to the relevant linecard(s) for use in processing the requests.

Figure 5B:
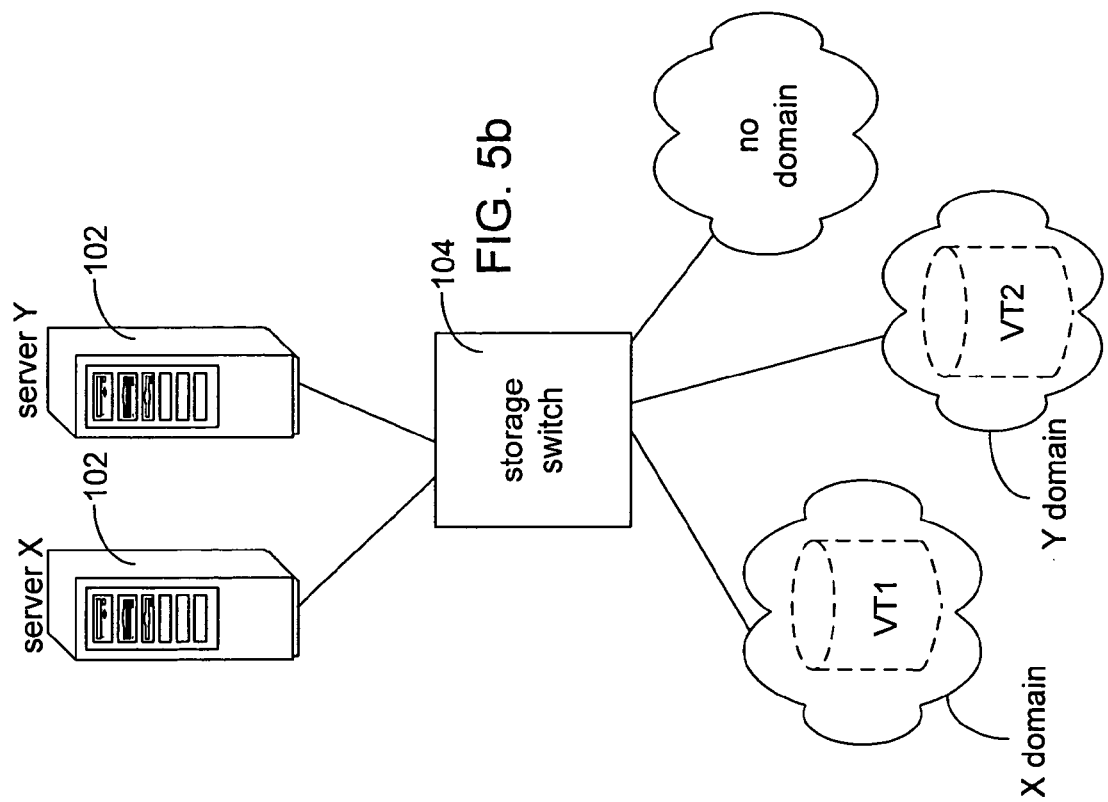
FIGS. 5a-5c are generalized functional block diagrams of a storage area network illustrating an exemplary provisioning of virtual targets.
Figure 5A:
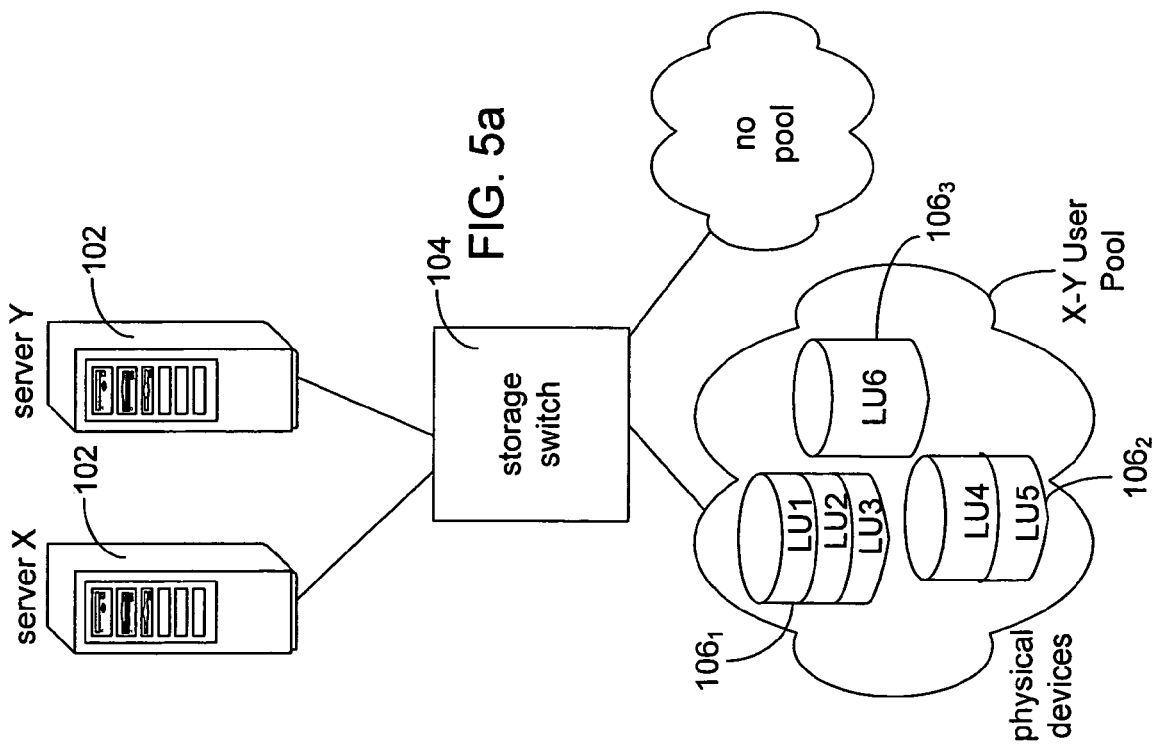
Figure 5C:
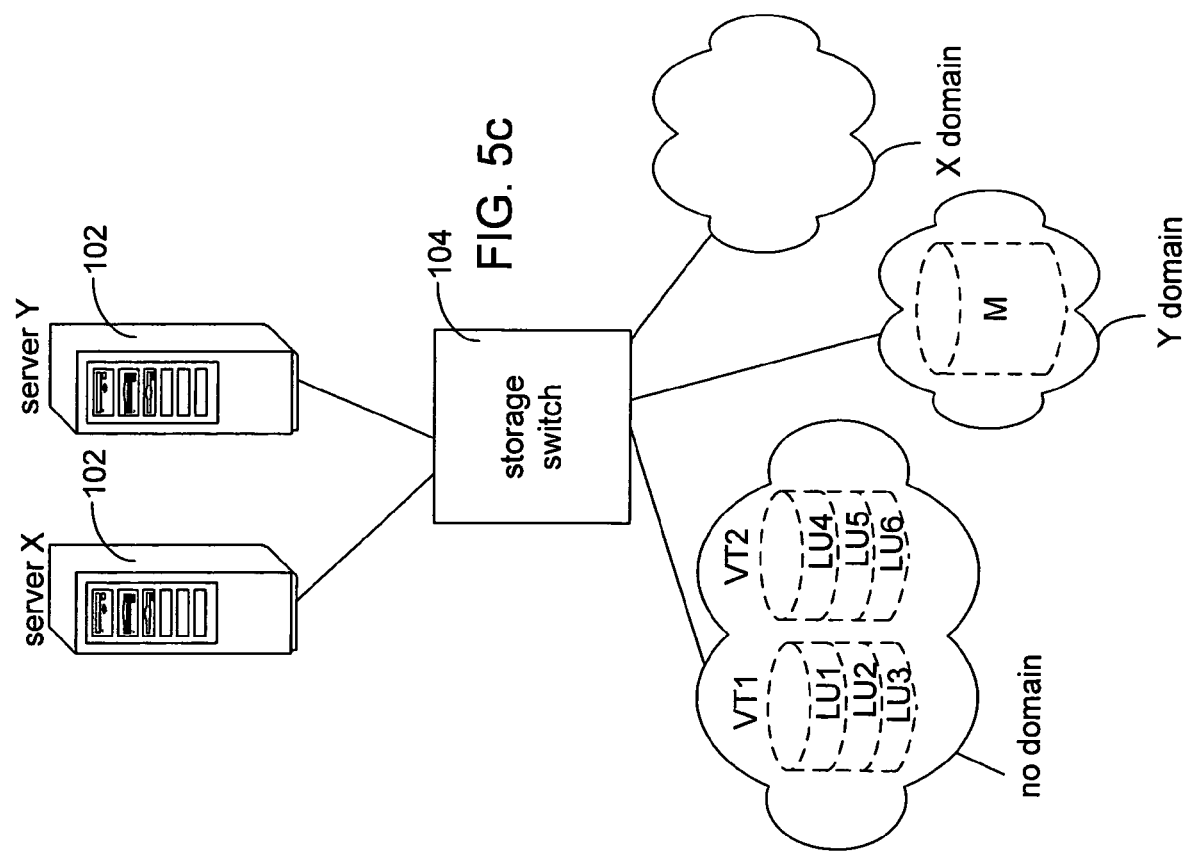

FIGS. 5a-5c illustrate one example of provisioning virtual targets in a storage area network. The system of FIGS. 5a-5c includes three physical devices $106_1$, $106_2$, and $106_3$, having a total of 6 LUs—LU1, LU2, LU3, LU4, LU5, LU6. In FIG. 5a, each physical device is coupled to a switch and placed in a pool accessible to two initiators X and Y, the "X-Y User Pool."

If initiator X and initiator Y each require one virtual target, then in one embodiment, the LUs are provisioned to form virtual targets VT1 and VT2, where VT1 includes as extents LUs 1-3 and VT2 includes as extents LUs 4-6 as depicted in FIG. 2b. VT1 is placed in the server X user domain and VT2 is placed in the server Y user domain. Initiator X will have access to VT1 but not VT2, while initiator Y will have access to VT2 but not VT1.

If instead, for example, initiator Y requires a mirrored virtual target M with a total of 6 LUs, VT1 and VT2 can be created as members of the virtual target M. VT1 and VT2 can be placed in the switch's No Domain (a domain where the physical targets are not directly accessible to users) while M is made accessible to Y, as shown in FIG. 2c. As members of M, VT1 and VT2 will not be independently accessible. VT1 is comprised of LUs 1-3 (physical device $106_1$), while VT2 is comprised of LUs 4-6 (physical devices $106_2$ and $106_3$). When a request is received to write data to the virtual target M, switch 104 will route the incoming data to both VT1 (physical device $106_1$) and VT2 (physical devices $106_2$ and/or $106_3$), thus storing the data in at least two physical locations.

Objects

As discussed above, each virtual target, each initiator connection, and each physical device is identified in the SCC database with information included in an object for the respective entity. Each virtual target object and physical target object will include a listing of extents or LUs that comprise it. An example of a Virtual Target object, in one embodiment of the invention, includes the following information:
 entity type
 entity identifier
 managing IP address
 time stamp and flags
 ports
 domain information
 SCN bit map
 capacity and inquiry information
 number of extents
 list of extents
 extent locator
 virtual mode pages
 quality of service policy (e.g., the first three entries of Table 4)
 statistics—usage, error, and performance data
 SLA identifier A physical target (or LU) object may include similar information. More information regarding VTD information can be found in U.S. patent application Ser. No. 10/051,396, entitled VIRTUALIZATION IN A STORAGE SYSTEM, filed Jan. 18, 2002.

Classification for Storage Switch

As packets or frames (generically referred to herein as "packets") arrive at the storage switch they are separated at each port into data and control traffic. Data traffic is routed to the PPU for wire-speed virtualization and translation, while control traffic such as connection requests or storage management requests are routed to the CPU. This separation is referred to herein as "packet classification" or just "classification" and is generally initiated in the PACE of the SPU. Accordingly, unlike the existing art, which forwards all packets to the CPU for processing, a system in accordance with the invention recognizes the packet contents, so that data traffic can be processed separately and faster, aiding in enabling wire-speed processing. GigE packets and FC frames are handled slightly differently, as described below.

Figure 6A:
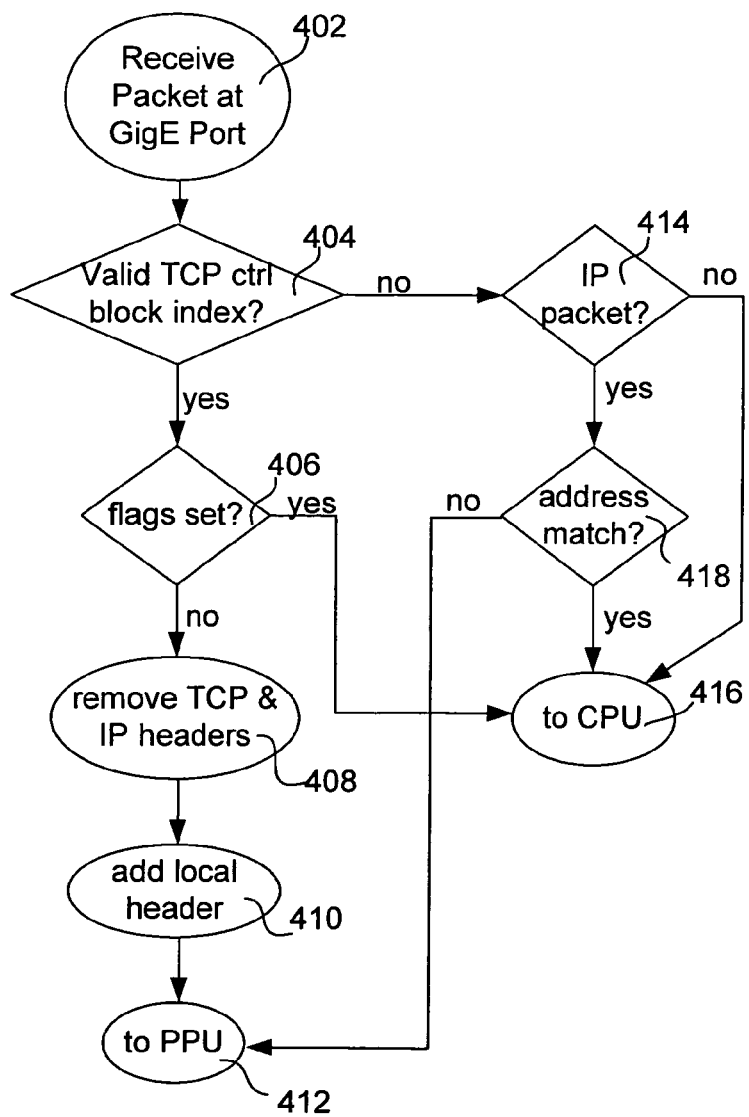
FIG. 6a is a flowchart depicting a classification process of iSCSI packets in the ingress direction as the process occurs in a PACE in accordance with one embodiment.

For packets arriving at a GigE port in the ingress direction (packets arriving at the switch), the following steps will be described with reference to FIG. 6a. A GigE port will receive a packet, which in one embodiment is either an IP packet or an iSCSI packet, step 402. Once the packet is received, the PACE determines if a virtual target access is recognized by whether it receives from the port a valid TCP Control Block Index with the packet (e.g., an index that is not −1), step 404. If there is a valid TCP Control Block Index, the PACE next checks the flags of the packet's TCP header, step 406. If the SYN, FIN, and RST flags of the TCP header are set, the packet is forwarded to the CPU, step 416, as the CPU would be responsible to establish and terminate a TCP session. Once an iSCSI TCP session is established, for managing the TCP session, the GigE port will receive a valid TCP control block from the CPU. But if the flags are not set, then in one embodiment the PACE will remove the TCP, IP, and MAC headers, step 408, leaving the iSCSI header, and then add a local header, step 410. Other embodiments, however, may leave the TCP, IP and MAC headers, and simply add a local header. Once the local header is added, the packet is sent to the PPU, step 412.

A local header can include a VTD ID to identify a VTD for a particular connection, a Flow ID to specify the destination port for a packet, a TCP Control Block Index to specify a TCP control block for a particular connection (if a TCP connection), a Type field to specify the packet classification (e.g., data or control), a Size field to indicate packet size, Task Index to track and direct the packet within the switch as well as to locate stored information related to the packet for the particular task, as well as some hardware identifiers such as source identifiers (e.g., identifying a source port, PACE, linecard, and/or CPU) and destination identifiers (e.g., identifying a distinction Port, PACE linecard, and/or CPU). The local header is used by various devices (e.g., PACE, PPU) throughout the switch. Accordingly, in some instances not all fields of the local header will be fully populated and in some instances the field contents may be changed or updated. An example of a local packet and conversion of a TCP packet can be found in co-pending U.S. patent application Ser. No. 10/051,321.

In the event that there is no valid TCP Control Block Index, step 604, then it is determined if the packet is an IP packet, step 414. If the packet is not an IP packet, it is forwarded to the CPU, step 416. If the packet is an IP packet, then the PACE checks the destination IP address, step 418. If the IP address matches that of the port of the storage switch, the packet is sent to the CPU, step 416, for processing. If the IP address does not match that of the port of the storage switch, then it is routing traffic and is forwarded to the PPU, step 412.

Figure 6B:
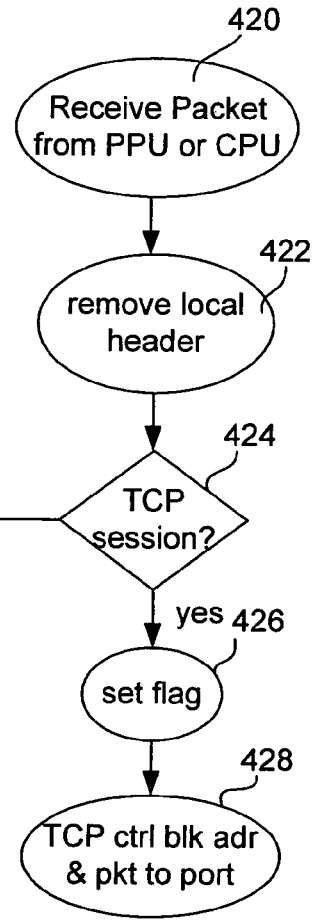
FIG. 6b is a flowchart depicting a classification process of iSCSI packets in the egress direction as the process occurs in a PACE in accordance with one embodiment.

Referring to FIG. 6b, when a packet destined for a GigE port is received in the egress direction by the PACE from an PPU or CPU, step 420, the PACE removes the local header, step 422. If the packet is for a TCP session, step 424, the PACE sets a control flag in its interface with the port to so inform the GigE port, step 426. If the packet is for a TCP session, the PACE passes the packet and the TCP Control Block Index to the port using interface control signals, step 428. If there is no TCP session, the packet is simply passed to the port, step 4300.

Figure 7A:
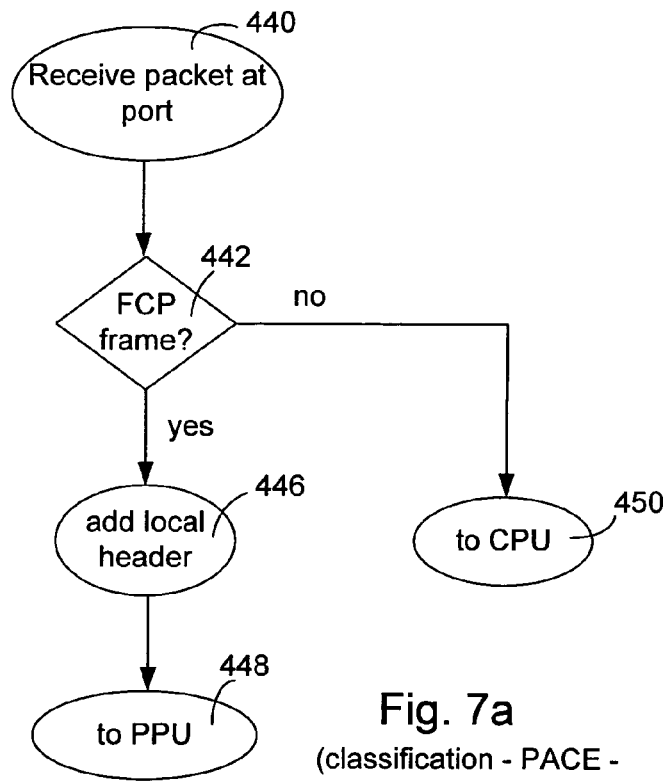
FIG. 7a is a flowchart depicting a classification process of FCP frames in the ingress direction as the process occurs in a PACE in accordance with one embodiment.

FIG. 7a illustrates the steps that occur at the PACE in classifying packets that arrive from an FC port. Unlike for a GigE port, the PACE for an FC port does not have to deal with a TCP Control Block Index. Instead, upon receiving a packet at an FC port, step 440, the S_ID field of the FCP frame header can be consulted to determine if the frame belongs to an open FC connection, however, this step is performed after the packet is passed to the PPU. Thus, the PACE only need determine if the frame is an FCP frame, step 442, which can be determined by consulting the R_CTL and TYPE fields of the frame header. A local header 4 is added, step 444, although the FCP frame header is not removed at this point as the data in the header will be useful to the PPU later. The local packet is then passed to the PPU, step 448. If the frame is not an FCP frame, it is passed to the CPU, step 450.

Figure 7B:
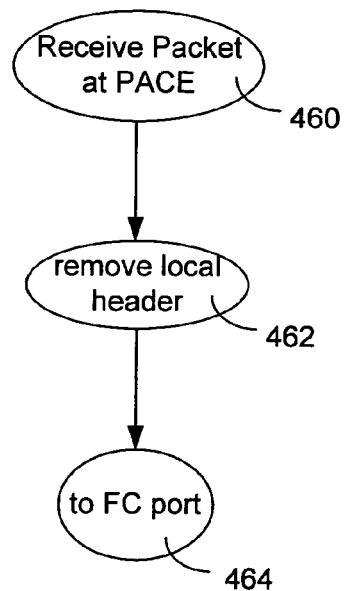
FIG. 7b is a flowchart depicting a classification process of FCP frames in the egress direction as the process occurs in a PACE in accordance with one embodiment.

Referring to FIG. 7b, when a packet destined for an FC port is received in the egress direction by the PACE from an PPU or CPU, step 460, the PACE simply removes the local header, step 462, before passing the frame to the FC port, step 464. The local header will indicate to the PACE which port (of the two ports the PACE is connected to) the packet is destined for.

Figure 8A:
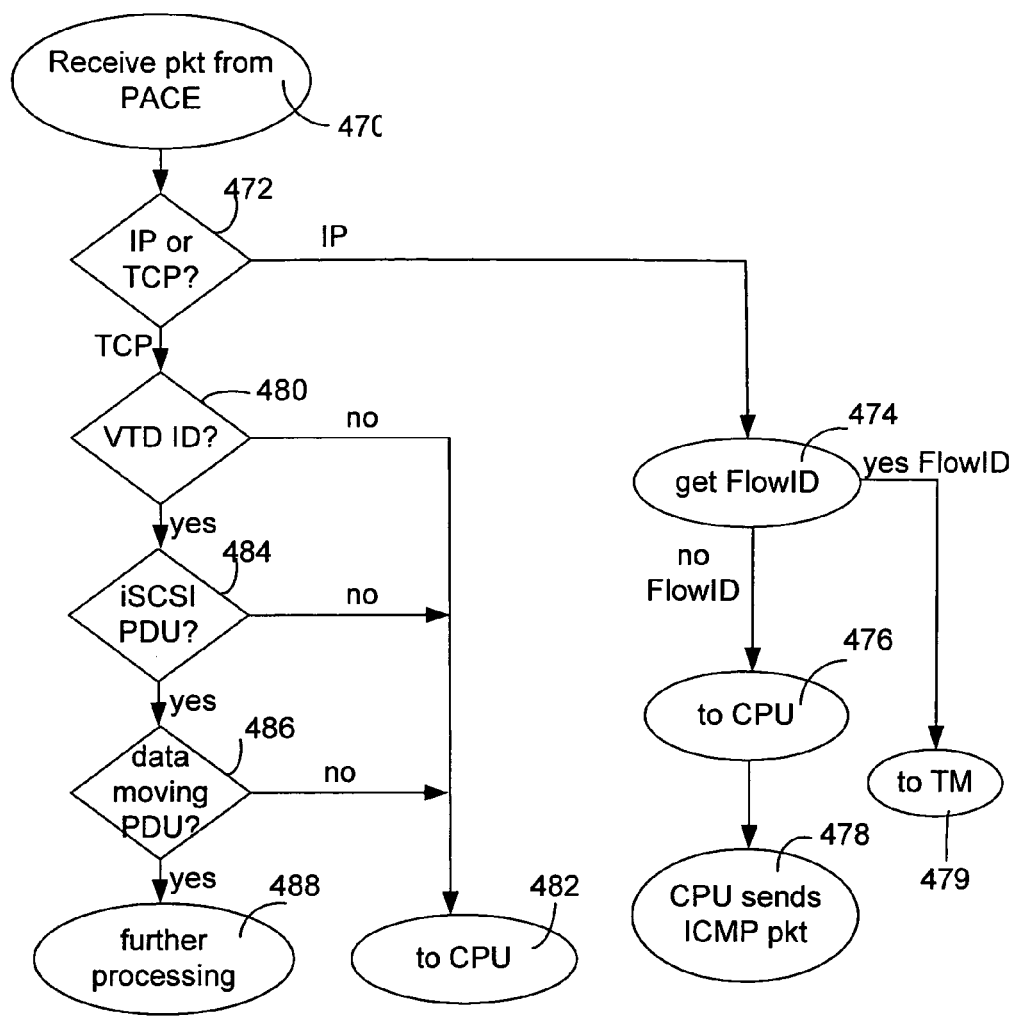
FIG. 8a is a flowchart depicting a classification process in the ingress direction as the process occurs in a PPU in accordance with one embodiment.

For packets received at either a GigE or FC port and that are passed to the PPU, the PPU further separates control traffic in one embodiment. Referring to FIG. 8a, when the PPU receives a packet from the PACE, step 470, the PPU determines if it is an IP or TCP packet, step 472. If the packet is an IP packet, the PPU searches its CAM to obtain the Flow ID of the packet from its route table, step 474. If the search fails, the packet has an unknown destination IP address, and it is passed to the CPU, step 476, which in turn sends an ICMP packet back to the source IP address step 478. If the search returns a Flow ID, then the packet is forwarded to the Traffic Manager, step 479.

When the packet received is a TCP packet, step 472, the PPU searches its CAM using the TCP Control Block Index, which identifies the TCP session, together with the LUN from the iSCSI header, which identifies the virtual target, to get a virtual target descriptor ID (VTD ID), step 480. The VTD IDs are essentially addresses or pointers to the VTDs stored in the PPU SRAM. The PPU uses the VTD ID to obtain the address of the VTD, step 480, so a search of VTD IDs allows the ability to quickly locate a VTD. If the VTD cannot be obtained, then the iSCSI session has not yet been established, and the packet is sent to the CPU, step 482. But if the VTD ID is obtained in step 480, the PPU determines if the packet contains an iSCSI PDU, step 484. If the packet does not contain an iSCSI PDU, it is forwarded to the CPU, step 482. But if it does include an iSCSI PDU, the PPU determines if the PDU is a data moving PDU (e.g., read or write command, R2T, write data, read data, response), step 486. If the PDU is not a data moving PDU, then the packet is passed to the CPU, step 482. But if the PDU is a data moving PDU, then the PPU performs further processing on the packet, step 488, e.g., virtualization and translation, as will be described later.

When the PPU receives an FCP frame with an FCP command IU in the ingress direction, the PPU performs similar steps to those described in FIG. 8a, steps 470, 480-488, except that the CAM search in step 480 uses the S_ID address and the LUN from the FCP frame to find the VTD ID.

Figure 8B:
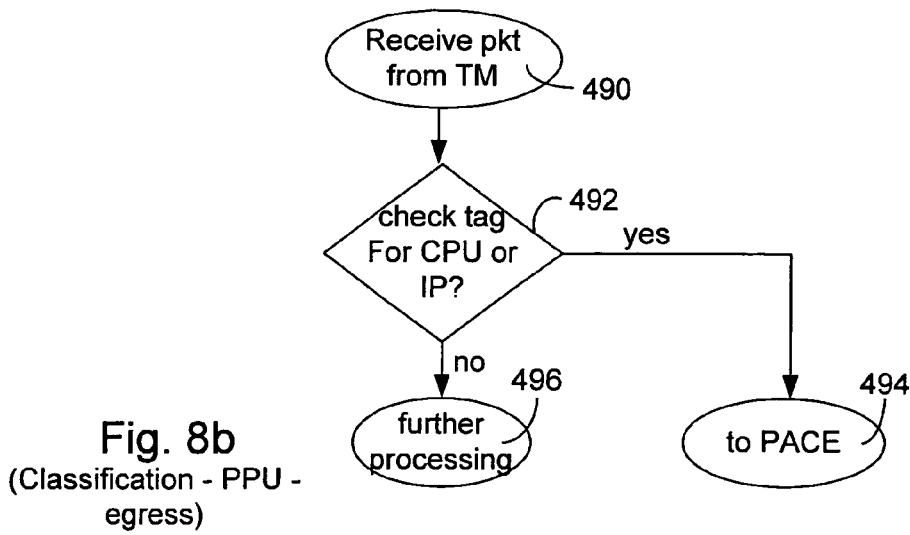
FIG. 8b is a flowchart depicting a classification process in the egress direction as the process occurs in a PPU in accordance with one embodiment.

In the egress direction, shown in FIG. 8b, after receiving a packet from the traffic manager, step 490, the PPU checks the Type field of the local header, step 492. If the field indicates that the packet is an IP packet or a packet destined for the CPU, then the PPU sends the packet to the PACE, step 494. Otherwise, the PPU performs further processing on the packet, step 496, e.g., virtualization and translation, as will be described later.

As described above, the CPU will be passed packets from the SPU in several situations. These situations include:

1. A non-TCP packet having the storage switch as its destination. Such a packet could be an ICMP, IP, RIP, BGP, or ARP packet, as are understood in the art. The CPU performs the inter-switch communication and IP routing function. The packet may also be SLP or iSNS requests that will be forwarded to the SCC.

2. An IP packet without a CAM match to a proper routing destination. While this situation will not frequently occur, if it does, the CPU returns an ICMP packet to the source IP address.
3. A non-iSCSI TCP packet. Such a packet would generally be for the CPU to establish or terminate a TCP session for iSCSI and will typically be packets with SYN, FIN, or RST flags set.
4. A non-FCP FC frame. Such frames are FLOGI, PLOGI, and other FCP requests for name services. Similar to iSCSI TCP session, these frames allow the CPU to recognize and to communicate with the FC devices. In one embodiment, the CPU needs to communicate with the SCC to complete the services.
5. An iSCSI PDU that is not a SCSI command, response, or data. Such a packet may be a ping, login, logout, or task management. Additional iSCSI communication is generally required before a full session is established. The CPU will need information from the SCC database to complete the login.
6. An iSCSI command PDU with a SCSI command that is not Read/Write/Verify. These commands are iSCSI control commands to be processed by the CPU where the virtual target behavior is implemented.
7. An FCP frame with a SCSI command that is not Read/Write/Verify. These commands are FCP control commands to be processed by the CPU where the virtual target behavior is implemented.

Switch-Based Storage Operations

One of ordinary skill in the art will have a general knowledge of the iSCSI and FC protocols. However, for more information on iSCSI refer to "draft-ietf-ips-iSCSI-20.txt," an Internet Draft (see www.ietf.org) and work in progress by the Internet Engineering Task Force (IETF), Jan. 19, 2003, incorporated herein by reference in its entirety. For more information about Fibre Channel (FC) refer to "SCSI Fibre Channel Protocol-2 (FCP-2)", Nov. 23, 2002, Rev: 08 (see www.t10.org), incorporated herein by reference in its entirety. In addition, both are further described in U.S. patent application Ser. No. 10/051,321, entitled STORAGE SWITCH FOR STORAGE AREA NETWORK, filed Jan. 18, 2002.

Virtualization

Exemplary ingress and egress processes for various packet types are described for explanatory purposes only. It will be understood that numerous processes for various packet types can be used in accordance with various embodiments. In one embodiment, after an incoming packet is classified as data or control traffic by the PPU, the PPU can perform virtualization for data packets without data buffering. For each packet received, the PPU determines the type of packet (e.g., command, R2T/XFER_RDY, Write Data, Read Data, Response, Task Management/Abort) and then performs either an ingress (where the packet enters the switch) or an egress (where the packet leaves the switch) algorithm to translate the virtual target to a physical target or vice versa. Thus, the virtualization function is distributed amongst ingress and egress ports. To further enable wire-speed processing, virtual descriptors are used in conjunction with a CAM, to map the request location to the access location. In addition, for each packet there may be special considerations. For instance, the virtual target to which the packet is destined may be spaced over several noncontiguous extents, may be mirrored, or both.

Command Packet—Ingress

Figure 9A:
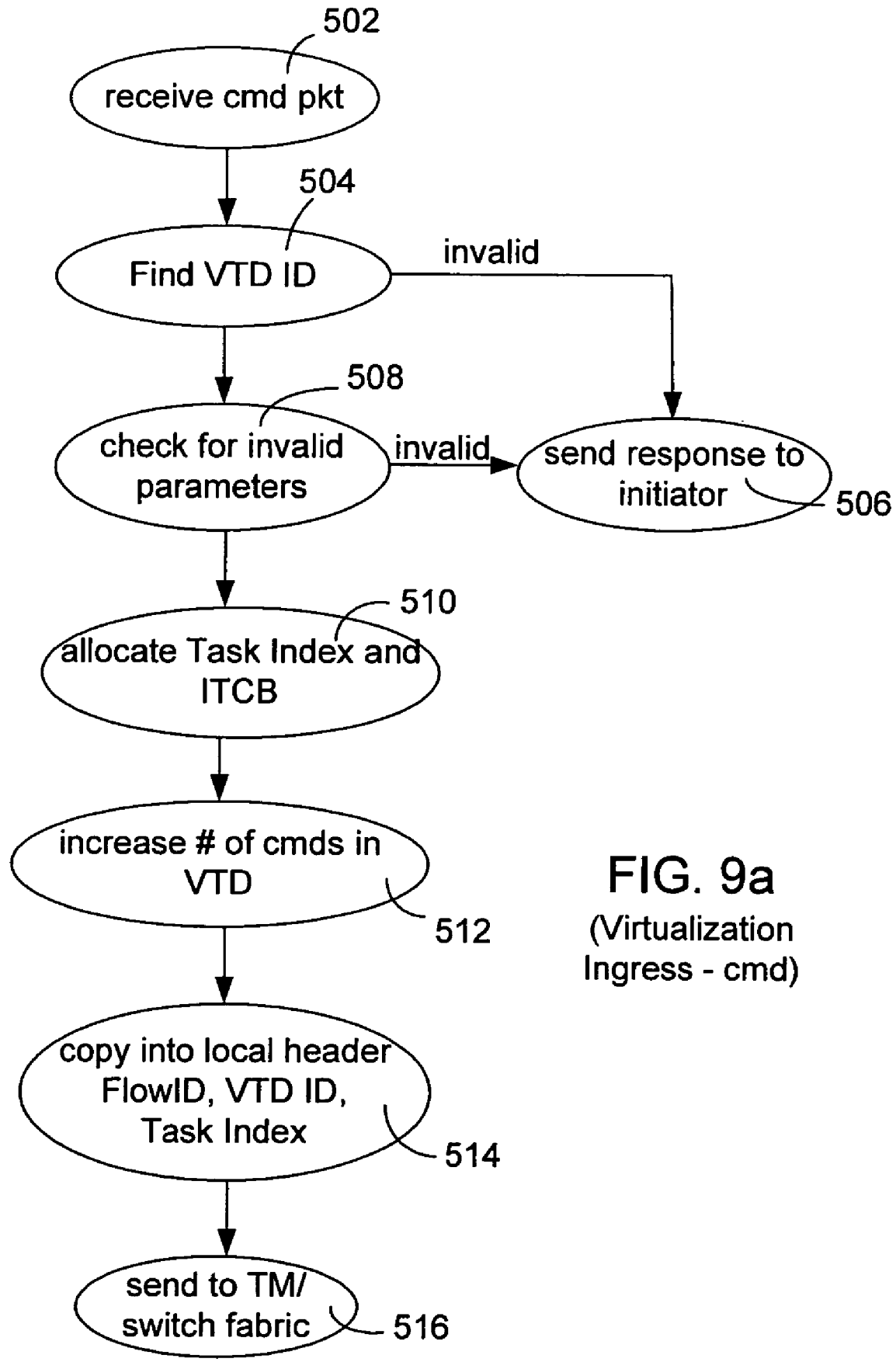
FIG. 9a is a flowchart illustrating a virtualization process in the ingress direction for command packets or frames, in accordance with one embodiment.

To initiate a transfer task to or from the virtual target, a SCSI command is sent by an iSCSI or FC initiator in an iSCSI PDU or FCP IU, respectively. Referring to FIG. 9a, when such a packet is received at the PPU (after classification), step 502, the PPU CAM is next checked to determine if a valid VTD ID exists, using the TCP Control Block Index and the logical unit number (LUN), in the case of an iSCSI initiator, or the S_ID (an identification of the source of the frame) and the LUN, in the case of an FC initiator, step 504. The LUNs in each case are found in the respective iSCSI PDU or FCP IU. If no valid VTD ID is found, then a response packet is sent back to the initiator, step 506. If a valid VTD is found, then a check is made for invalid parameters, step 508. If invalid parameters exists, a response packet is sent back to the iSCSI or FC initiator, step 506.

A Task Index is allocated along with an Ingress Task Control Block (ITCB), step 510. The Task Index points to or identifies the ITCB. The ITCB stores the Flow ID (obtained from the VTD), the VTD ID, command sequence number or CmdSN (from the iSCSI packet itself), as well as an initiator (originator) identification (e.g., the initiator_task_tag sent in the iSCSI PDU or the OX_ID in the FCP frame header). The OX_ID is the originator (initiator) identification of the exchange. The ITCB is stored in the PPU SRAM. Of course there may be many commands in progress at any given time, so the PPU may store a number of ITCBs at any particular time. Each ITCB will be referenced by its respective Task Index.

The VTD tracks the number of outstanding commands to a particular virtual target, so when a new ITCB is established, it increments the number of outstanding commands, step 512. In some embodiments, VTDs establish a maximum number of commands that may be outstanding to any one particular virtual target. The Flow ID, the VTD ID, and the Task Index are all copied into the local header, step 514. The Flow ID tells the traffic manager the destination linecards and ports. Later, the Task Index will be returned by the egress port to identify a particular task of a packet. Finally, the packet is sent to the traffic manager and then the routing fabric, so that it ultimately reaches an egress PPU, step 516.

When a virtual target is composed of multiple extents, there are multiple Flow IDs identified in the VTD, one for each extent. The PPU checks the block address for the packet and selects the correct Flow ID. For example, if a virtual target has two 1 Gb extents, and the block address for the command is in the second extent, then the PPU selects the Flow ID for the second extent. In other words, the Flow ID determines the destination/egress port. If a read command crosses an extent boundary, meaning that the command specifies a starting block address in a first extent and an ending block address in a second extent, then after reading the appropriate data from the first extent, the PPU repeats the command to the second extent to read the remaining blocks. For a write command that crosses an extent boundary, the PPU duplicates the command to both extents and manages the order of the write data. When a read command crosses an extent boundary, there will be two read commands to two extents. The second read command is sent only after completing the first to ensure the data are returned sequentially to the initiator.

Command Packet—Egress

Figure 9B:
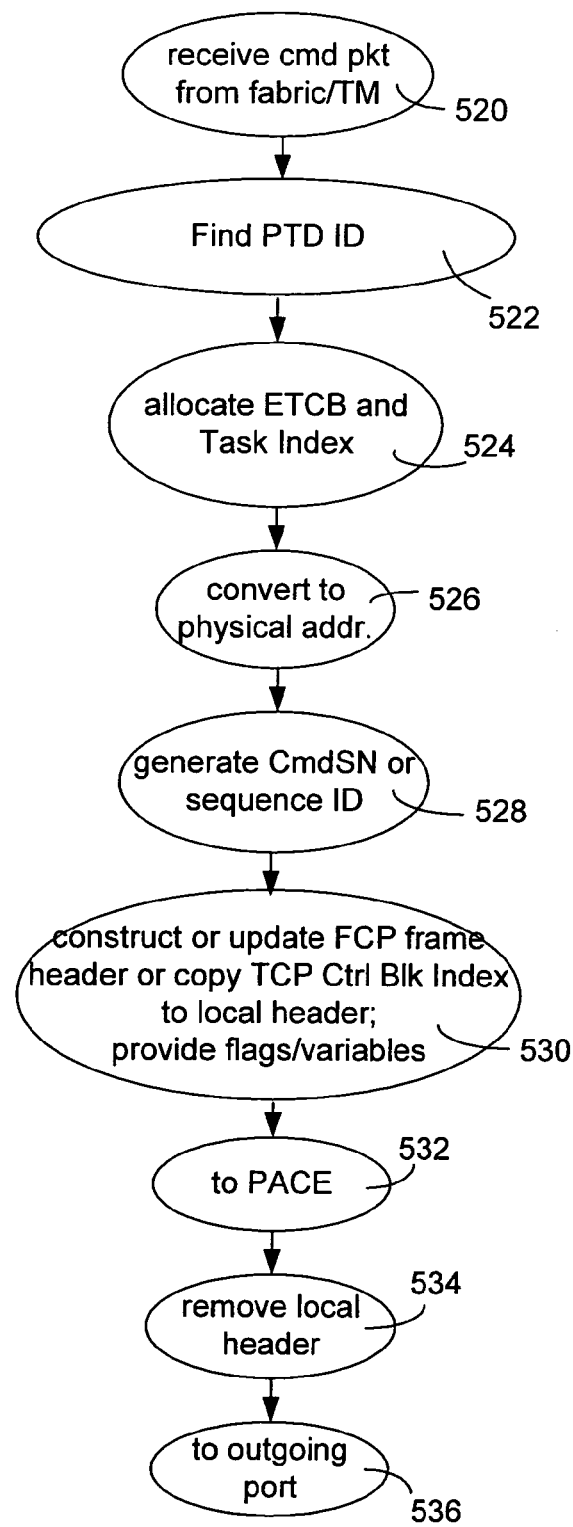
FIG. 9b is a flowchart illustrating a virtualization process in the egress direction for command packets or frames, in accordance with one embodiment.

Referring to FIG. 9b, after a command PDU or IU has passed through the switch fabric, it will arrive at an PPU, destined for an egress port, step 520. The PPU attempts to identify the physical device(s) that the packet is destined for, step 522. To do so, the VTD ID from the local header is used to search the PPU CAM for a PTD ID (Physical Target Descriptor Identifier). The VTD ID is affiliated with and indexes a particular PTD ID associated with the particular egress PPU. PTDs are stored in the PPU SRAM, like VTDs, and also contain information similar to that found in a VTD. If the search is unsuccessful, it is assumed that this is a command packet sent directly by the CPU and no additional processing is required by the PPU, causing the PPU to pass the packet to the proper egress port based on the Flow ID in the local header. If the search is successful, the PTD ID will identify the physical target (including extent) to which the virtual target is mapped and which is in communication with the particular egress linecard currently processing the packet.

The PPU next allocates a Task Index together with an egress task control block (ETCB), step 524. In an embodiment, the Task Index used for egress is the same as that used for ingress. The Task Index also identifies the ETCB. In addition, the ETCB also stores any other control information necessary for the command, including CmdSN of an iSCSI PDU or an exchange sequence for an FCP IU.

Using the contents of the PTD, the PPU converts the SCSI block address from a virtual target to the block address of a physical device, step 526. Adding the block address of the virtual target to the beginning block offset of the extent can provide this conversion. For instance, if the virtual target block sought to be accessed is 1990 and the starting offset of the corresponding first extent is 3000, then the block address of the extent to be accessed is 4990. Next the PPU generates proper iSCSI CmdSN or FCP sequence ID, step 528 and places them in the iSCSI PDU or FCP frame header. The PPU also constructs the FCP frame header if necessary (in some embodiments, after the ingress PPU reads the necessary information from the FCP header, it will remove it, although other embodiments will leave it intact and merely update or change the necessary fields at this step) or for a packet being sent to an iSCSI target, the TCP Control Block Index is copied into the local header from the PTD, step 530. In addition, the PPU provides any flags or other variables needed for the iSCSI or FCP headers. The completed iSCSI PDU or FCP frame are then sent to the PACE, step 532, which in turn strips the local header, step 534, and passes the packet to appropriate port, step 536.

R2T or XFER RDY—Ingress

Figure 10A:
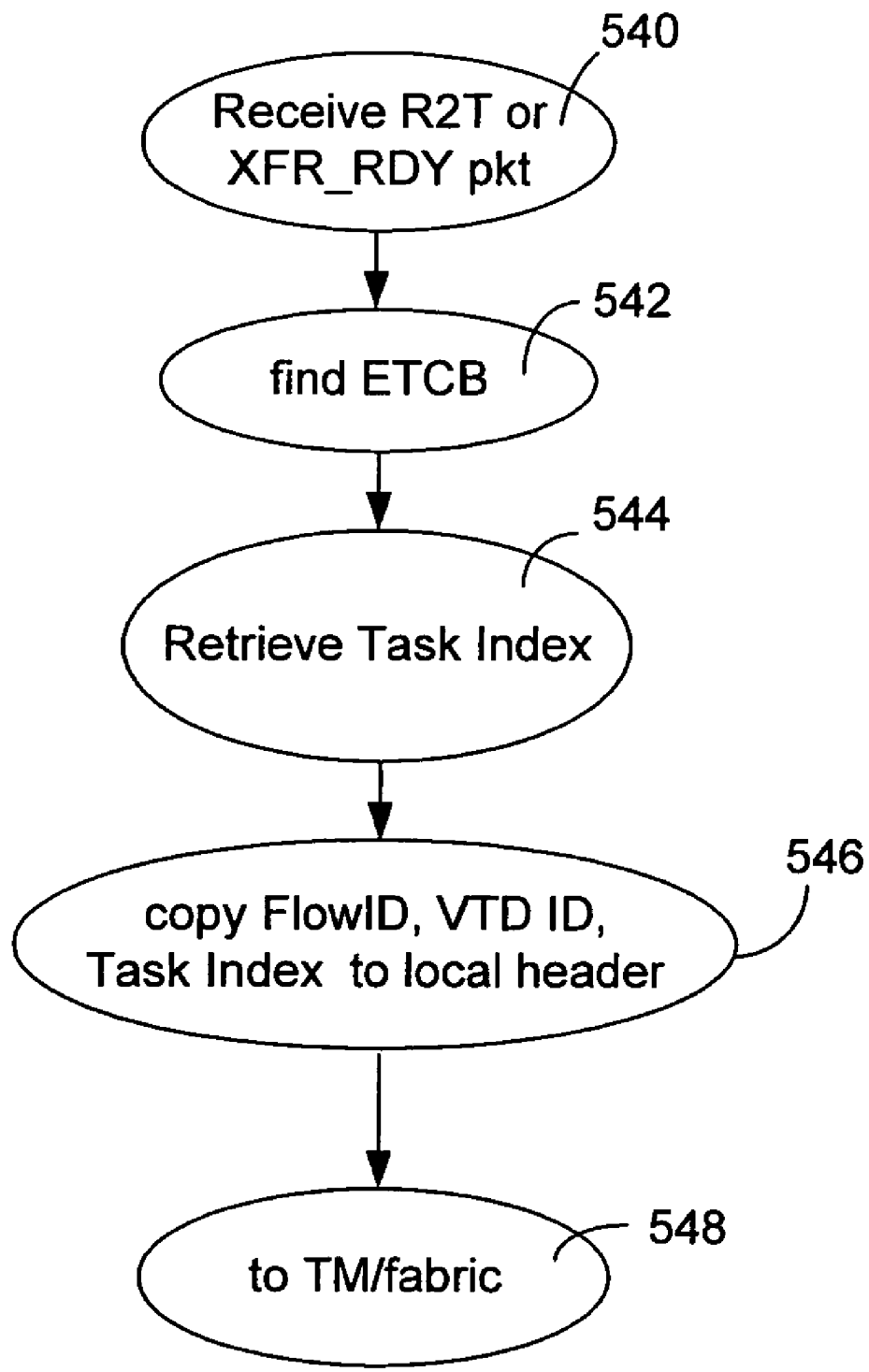
FIG. 10a is a flowchart illustrating a virtualization process in the ingress direction for R2T or XFER_RDY packets or frames, in accordance with one embodiment.

Referring to FIG. 10*a*, after a command has been sent to a target storage device as described above, and the command is a write command, an R2T PDU or an XFER_RDY IU will be received from a storage device when it is ready to accept write data, step 540. The PPU identifies the corresponding ETCB, step 542, by using the initiator_task_tag or OX_ID inside the packet. In some embodiments, the initiator_task_tag or OX_ID of the packet is the same as the Task Index, which identifies the ETCB. If the PPU cannot identify a valid ETCB because of an invalid initiator_task_tag or OX_ID, the packet is discarded. Otherwise, once the ETCB is identified, the PPU retrieves the Ingress Task Index (if different from the Egress Task Index) and the VTD ID from the ETCB, step 544. The PPU also retrieves the Flow ID from the PTD, which is also identified in the ETCB by the PTD ID. The Flow ID indicates to the traffic manager the linecard of the original initiator (ingress) port. The Flow ID, the VTD ID, and the Task Index are copied into the local header of the packet, step 546. Finally the packet is sent to the traffic manager and the switch fabric, step 548.

R2T or XFER RDY—Egress

Figure 10B:
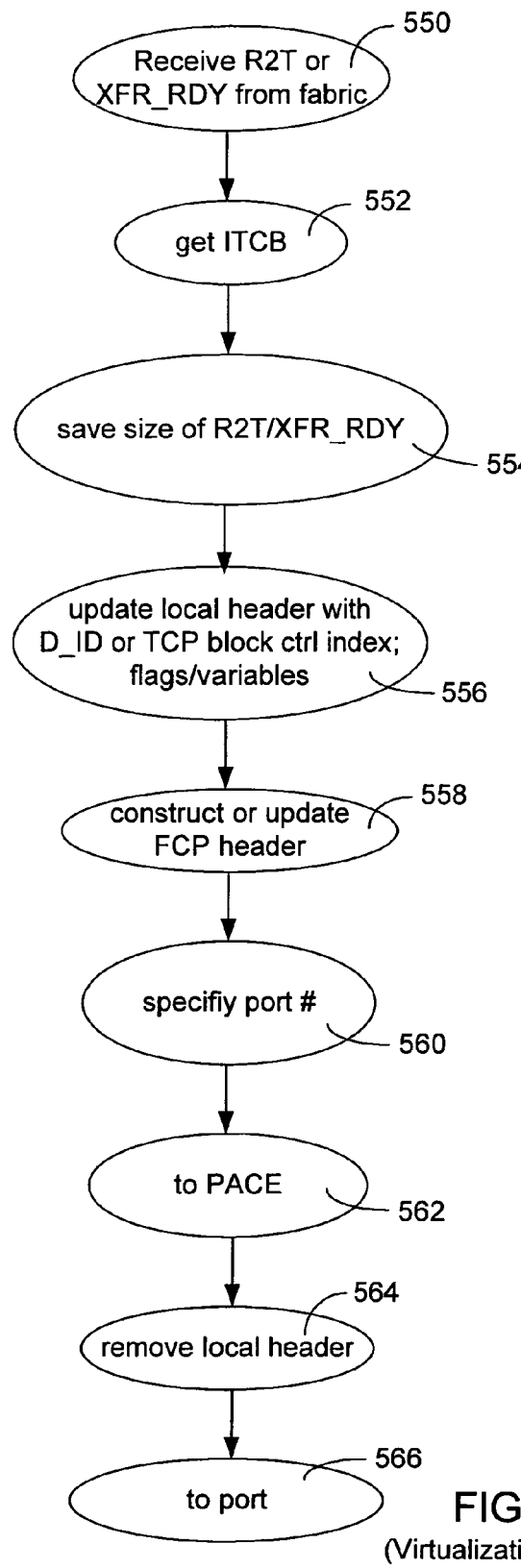
FIG. 10b is a flowchart illustrating a virtualization process in the egress direction for R2T or XFER_RDY packets or frames, in accordance with one embodiment.

Referring to FIG. 10*b*, after the R2T or XFER_RDY packet emerges from the switch fabric, it is received by a PPU, step 550, on its way to be passed back to the initiator (the device that initiated the original command for the particular task). The Task Index identifies the ITCB to the PPU, step 552, from which ITCB the original initiator_task_tag and the VTD ID can be obtained. The R2T/XFER_RDY Desired Data Transfer Length or BURST_LEN field is stored in the ITCB, step 554. The local header is updated with the FCP D_ID or the TCP Control Block Index for the TCP connection, step 556. Note that the stored S_ID from the original packet, which is stored in the ITCB, becomes the D_ID. If necessary, an FCP frame header is constructed or its fields are updated, step 558. The destination port number is specified in the local header in place of the Flow ID, step 560, and placed along with the initiator_task_tag in the SCSI PDU or, for an FC connection, the RX_ID and OX_ID are placed in the FCP frame. The RX_ID field is the responder (target) identification of the exchange. The PPU also places any other flags or variables that need to be placed in the PDU or FCP headers. The packet is forwarded to the PACE, step 562, which identifies the outgoing port from the local header. The local header is then stripped, step 564 and forwarded to the proper port for transmission, step 566.

In the event that the command is split over two or more extents, e.g., the command starts in one extent and ends in another, then the PPU must hold the R2T or XFER_RDY of the second extent until the data transfer is complete to the first extent, thus ensuring a sequential data transfer from the initiator. In addition, the data offset of the R2T or XFER_RDY of the second extent will need to be modified by adding the amount of data transferred to the first extent.

Write Data Packet—Ingress

Figure 11A:
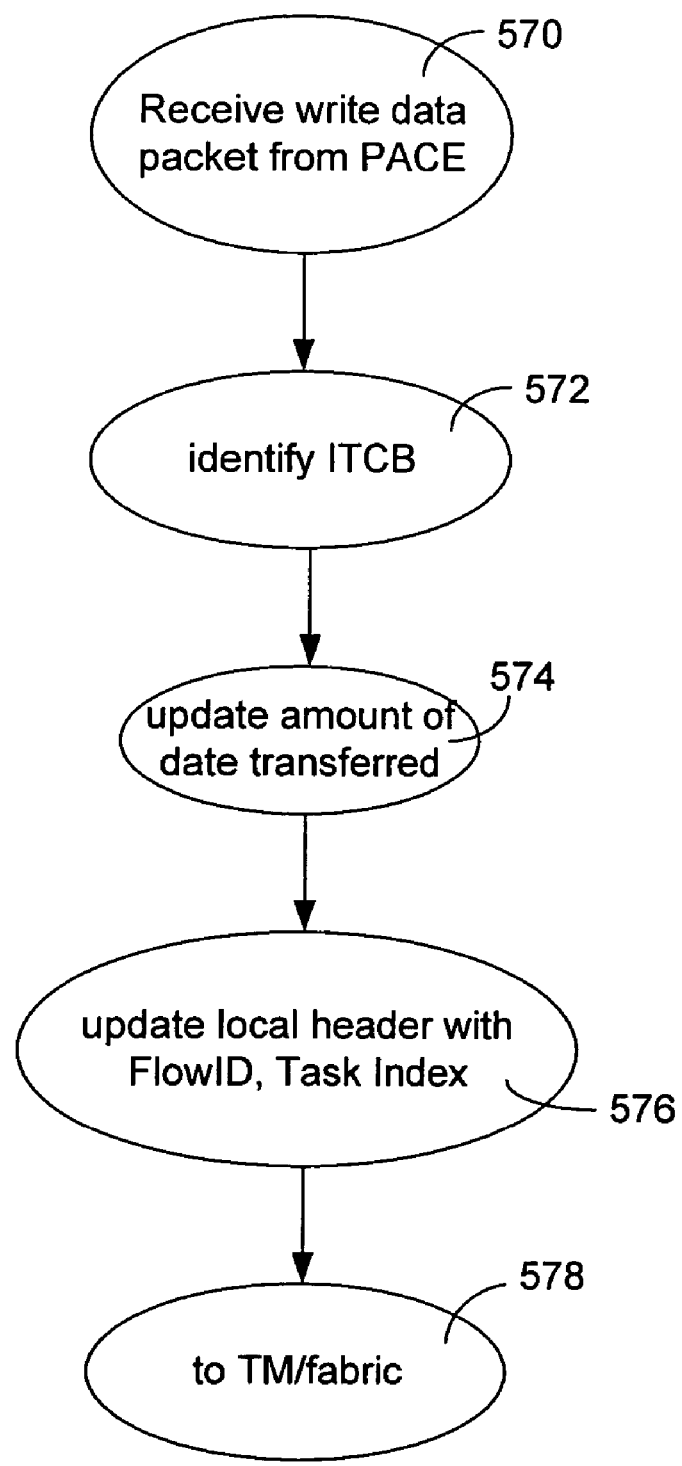
FIG. 11a is a flowchart illustrating a virtualization process in the ingress direction for write data packets or frames, in accordance with one embodiment.

After an initiator receives an R2T or XFER_RDY packet it returns a write-data packet. Referring to FIG. 11*a*, when a write-data iSCSI PDU or FC IU is received from an initiator, step 570, the ITCB to which the packet belongs must be identified, step 572. Usually, the ITCB can be identified using the RX_ID or the target_task_tag, which is the same as the Task Index in some embodiments. The SPU further identifies that received packets are in order. In some circumstances, however, the initiator will transfer unsolicited data: data that is sent prior to receiving an R2T or XFER_RDY. In such a case, the PPU must find the ITCB by a search through the outstanding tasks of a particular virtual target. But if the ITCB is not found, then the packet is discarded. If the ITCB is found, the total amount of data to be transferred is updated in the ITCB, step 574. The Flow ID and Task Index are added to the local header of the packet, step 576. The packet is then forwarded to the traffic manager and ultimately to the switch fabric, step 578.

Write Data Packet—Egress

Figure 11B:
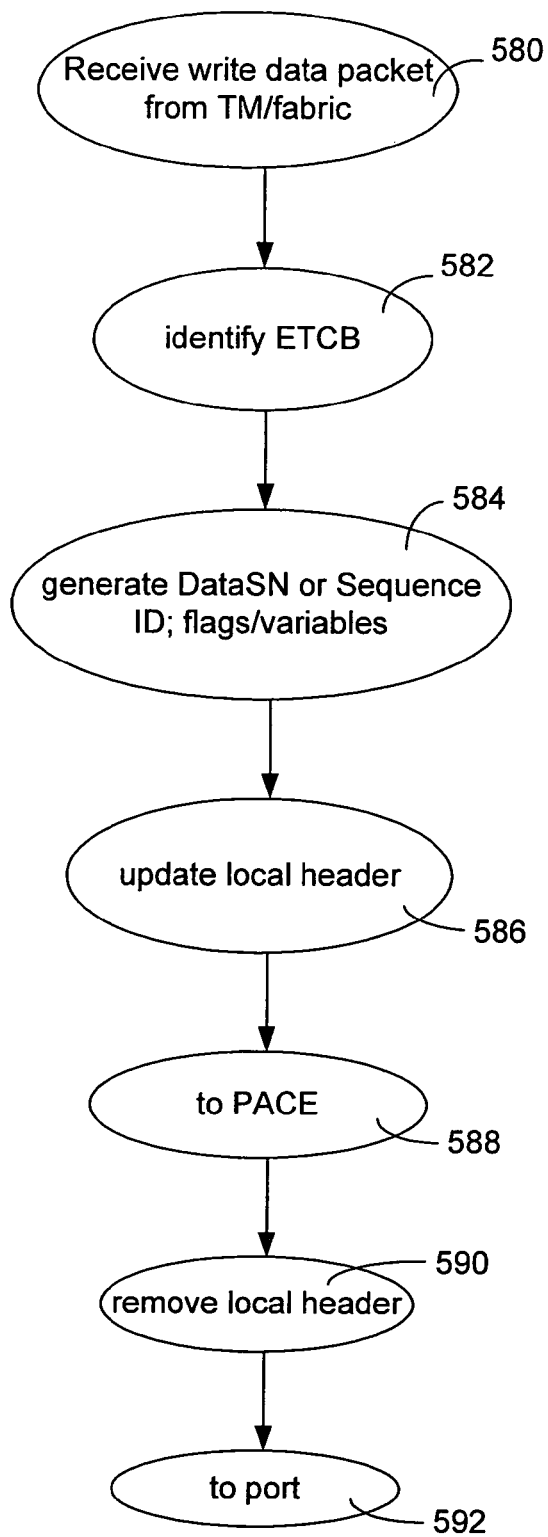
FIG. 11b is a flowchart illustrating a virtualization process in the egress direction for write data packets or frames, in accordance with one embodiment.

Referring to FIG. 11*b*, when a write-data packet is received from the switch fabric (via the traffic manager), step 580, the ETCB for the packet needs to be identified, step 582. Typically, the ETCB can be identified using the Task Index in the local header. Once the ETCB is found, using the information inside the ETCB, the PPU generates proper iSCSI DataSN or FCP sequence ID, step 584, along with any other flags and variables, e.g, data offset, for the PDU or FCP frame header. The local header is updated with the TCP Control Block Index or the FCP D_ID from the PTD, step 586. The port number is also added to the local header. The finished iSCSI PDU or FCP frame is sent to the PACE, step 588, which removes the local header, step 590, and forwards the packet to the appropriate port, 592.

Storage-Switch Based Replication

Replication generally refers to maintaining an identical copy of data at remote locations to provide for recovery in case of later unavailability. Typically, replication refers to maintaining a copy of data at a geographically remote and separate location to provide for recovery in a disaster scenario causing complete unavailability of data (permanent or temporal) at a location. For example, scheduled backups may be implemented to transfer the contents of a volume at one location to another remote location. Should data be lost at the primary or remote locations, the data from the available location can be copied to the location whose data was lost. Although replication is typically performed between two storage systems at distinct remote locations, it will be understood that the principles embodied herein can be applicable to many types of data backup or transfer including, but not limited to, transfers using two switches to store data in locations ranging from across continents, to across states or towns, or simply across a room.

Figure 12:
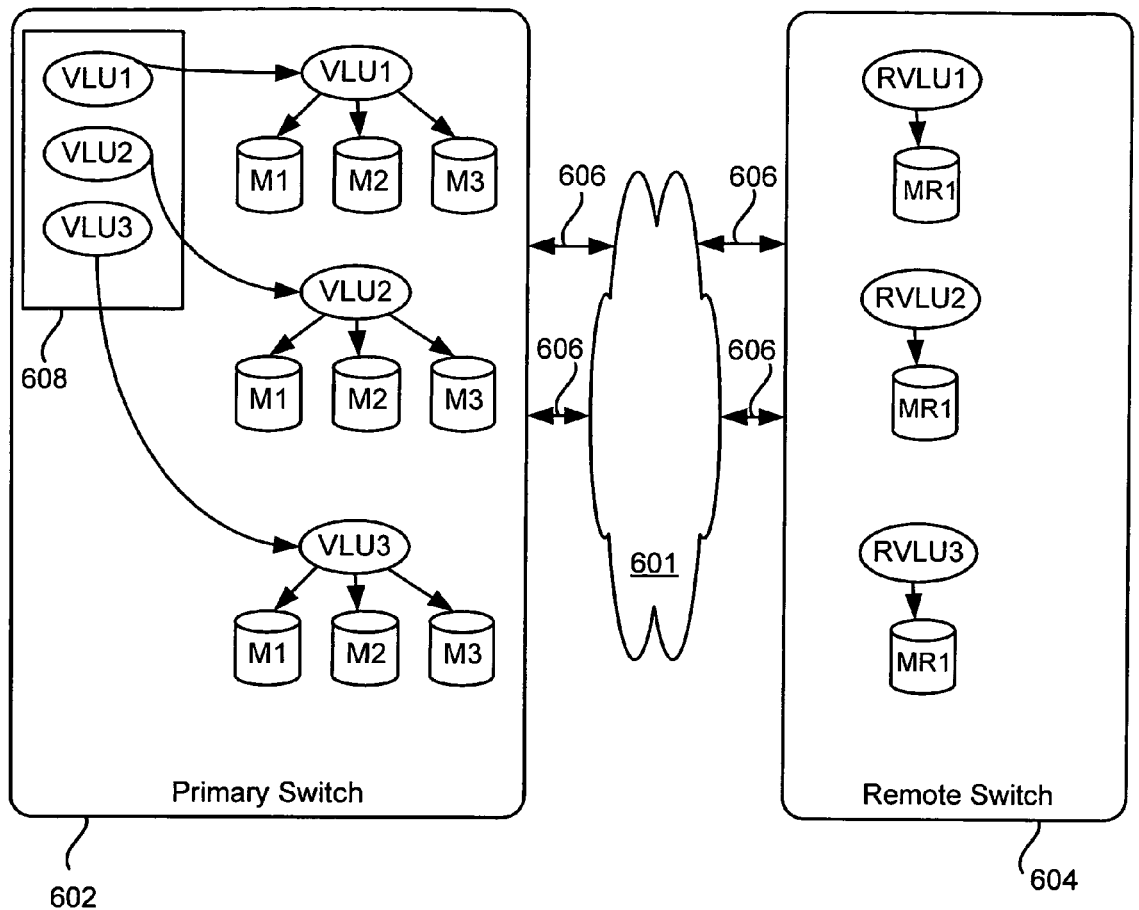
FIG. 12 is a block diagram depicting a storage area network including a primary switch and a remote switch in accordance with one embodiment.

FIG. 12 depicts a block diagram of a storage area network illustrating primary virtual targets at a primary switch 602 that are replicated to corresponding remote virtual logical units at a secondary switch 604. The switches are connected over one or more inter-chassis links (ICL) 606 at one or more linecards and ports of each storage switch. ICL link(s) 606 can include, in various embodiments, any suitable protocol, including but not limited to fibre-channel, Gigabit Ethernet (utilizing iSCSI protocol), or Internet Protocol (IP). The switches can be connected directly, over one or more networks 601, or have other switches connected in between with similar ICLs.

Three virtual logical units, VLU1, VLU2, and VLU3, are provisioned at primary switch 602 and grouped in a consistency group 608. The VLUs at a primary switch may be referred to as a primary VLU to designate that they are the source for replication operations. A consistency group can be established for selected logical units to be replicated during replication operations. Such consistency groups are not necessary but can be used when it is desired to replicate multiple volumes at exact moments in time. Each VLU is provisioned with three members, although more or less than four members can be used in various embodiments. Each member represents the virtualization within the switch of distinct physical storage at or accessible to the switch. Each member and its extents can map to one or more logical units of one or more actual physical devices or storage subsystems. Three remote VLUs, RVLU1, RVLU2, and RVLU3, are provisioned at remote storage switch 604. Each VLU at primary switch 602 has a corresponding RVLU at the secondary chassis that is used to replicate the data from the associated VLU at the primary switch. As illustrated, it is not necessary for the remote VLUs and primary VLUs to include the same number of VLU members. Furthermore, a primary VLU may be provisioned as a mirrored unit having two or more mirrored members while a corresponding RVLU is not provisioned as mirrored VLU.

A VLU at the primary chassis is replicated by providing an identical copy of the data stored in the volume across ICL 606 to the secondary chassis for storage in the corresponding remote VLU (and physically in the underlying storage subsystem(s)). In many asynchronous replication operations, the entire volume at the primary site is copied to the remote site every time a replication is performed. In many synchronous replication operations, by contrast, data is concurrently updated at each location in response to host or application accesses to the volume. As previously described, each of these scenarios presents drawbacks including excess time to copy unneeded data and degradation of application performance on host devices because of delays in writing the data to the remote target(s).

In accordance with embodiments, a change log is provided at a storage switch that includes an indication of changes made to a primary volume between two distinct moments in time. For example, a change log can indicate changes to the volume since or during a replication to a remote VLU. A change log that indicates the changes to a primary volume since a last replication to a remote volume can be used to minimize the amount of data that is transferred during a subsequent replication to the actual data that has been changed or data that is associated with data that has been changed (e.g., data in blocks close to those of changed data). For example, the change log can be used so that only those blocks or groups of blocks including a changed block are copied to the remote VLU.

In accordance with other embodiments, mirrored primary VLUs are used so that a primary volume can remain online to process input/output (I/O) requests from initiating devices during replication operations. A mirrored virtual target (or mirrored VLU) maintains data in two or more physical locations for improved reliability in data storage. A mirrored virtual target or VLU includes at least two members, each representing the virtualization of different physical targets or groups of physical targets. When a mirrored virtual target is initially provisioned, the data stored in each member of the virtual target is synchronized to establish an initial mirrored state for the virtual target with each target member storing an identical set of data for the mirrored virtual target in its underlying physical target(s).

In one embodiment, a mirrored member can be split or removed from the primary VLU and used to replicate data to the remote volume. One or more remaining members of the primary VLU can remain online to process incoming I/O requests. A change log that indicates changes to the primary volume since the split of the mirrored member can be used to later rejoin the split member to the primary VLU. The split member can be synchronized with the primary VLU and its members by copying only the data indicated by the change log. Mirrored members can also provide for multiple simultaneous and distinct point in time replications of the same primary volume. A first member can be split at a first time and used to replicate the data of the primary up to that point in time. A second member can later be split after or while the first replication is still proceeding to provide a second point in time replication. One or more change logs can be provided to track changes in the primary volume while each mirrored member is split from the primary for a subsequent join operation. The change log corresponding to the most recently split and replicated member can remain online after the member is rejoined to track changes since the last replication to the remote VLU.

Various examples of replication and related operations in accordance with embodiments are presented with respect to the exemplary volumes illustrated in the following figures. One of ordinary skill in the art will understand that many primary and remote virtual logical unit configurations and operations can be used in accordance with various embodiments while remaining within the scope of the present disclosure. The exemplary logical units and operations set forth in FIGS. 13-21 are provided as examples to illustrate various features, options, and implementations in accordance with embodiments and should not be construed as limiting, but exemplary.

Figure 13:
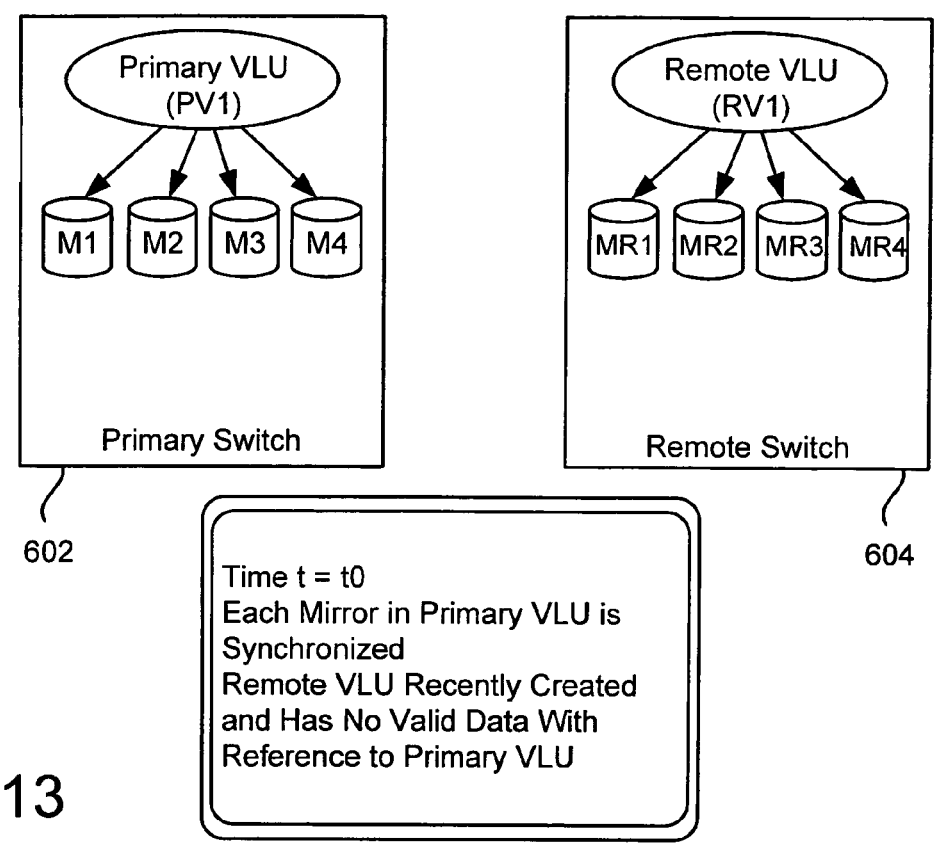
FIG. 13 is a block diagram depicting selected components of the storage area network depicted in FIG. 12 in accordance with one embodiment.

FIG. 13 depicts primary switch 602 and an exemplary primary virtual logical unit PV1 provisioned at the switch. PV1 includes four mirrored members M1-M4. In other embodiments, more or less than four members may be used (e.g., 1, 6 or 8 members). Each member includes one or more extents and represents the virtualization of one or more LUs of one or more physical devices or storage subsystems. Remote chassis 604 includes an exemplary remote VLU RV1, having four members MR1-MR4. RV1 may also include any number of members in embodiments, such as a single member, 8 members or more. RV1 need not include the same number of members as PV1 although it can. FIG. 13 and many of the following figures will be used to present various replication operations that may be performed at various relative times.

FIG. 13 represents a state of each logical unit at a time t=t0. At t0, each mirrored member of PV1 is synchronized and storing an identical copy of data for PV1. Remove VLU RV1 and contains no valid data with respect to PV1 at t=t0.

Figure 14A:
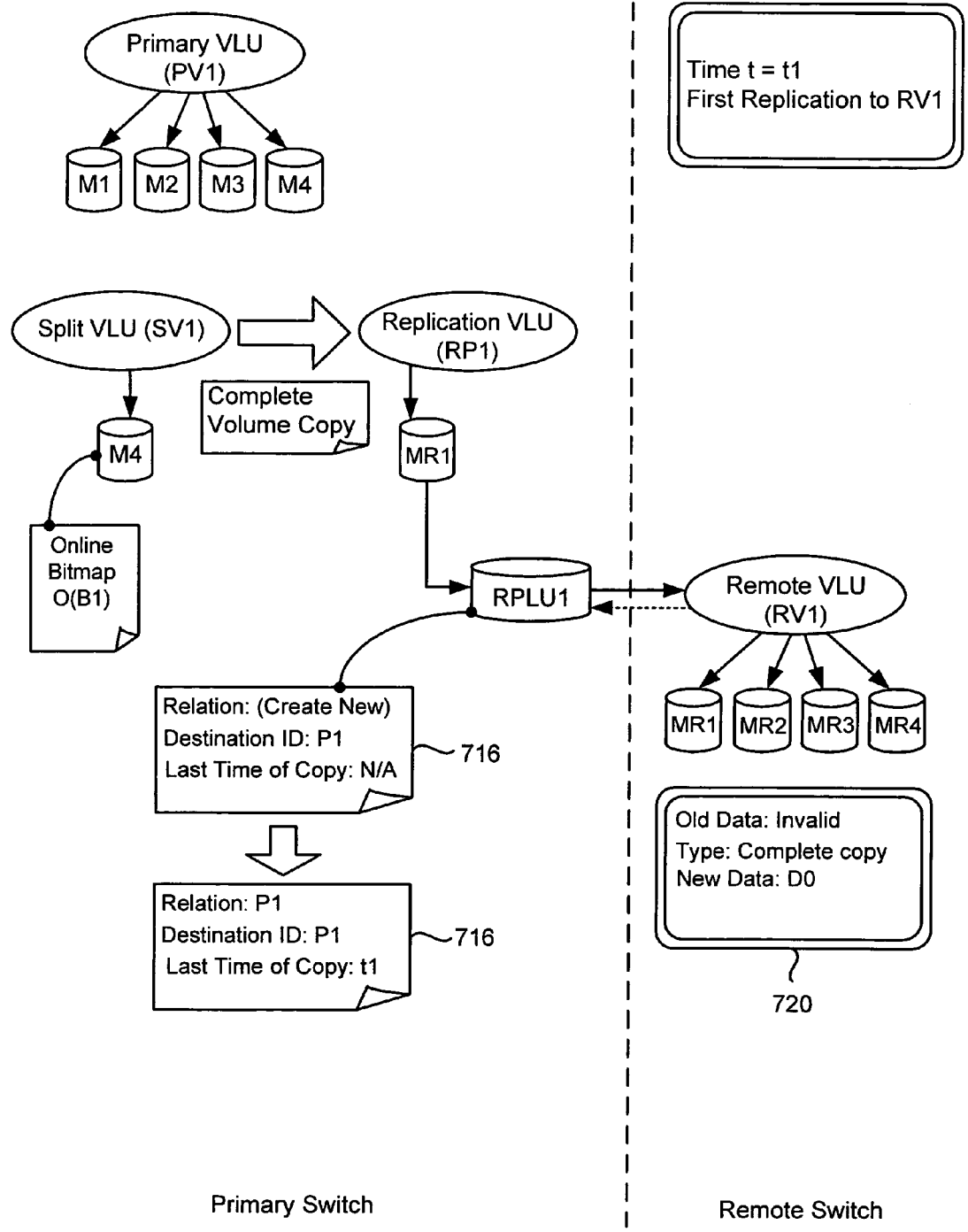
FIG. 14a is a block diagram of select components of a storage area network depicting a replication operation in accordance with one embodiment.

FIG. 14a is a block diagram illustrating various components of primary switch 602 and remote switch 604 relevant to an initial replication operation of primary VLU PV1 to remote VLU RV1. The replication of PV1 begins by splitting or removing one of the mirrored members from the primary virtual logical unit. Any synchronized mirrored member of PV1 can be split or removed for the replication operation. A member can be split from its associated VLU by removing the designation of the split member from a virtual target descriptor object for the VLU. In FIG. 14A, member M4 is split from the primary VLU and a split virtual logical unit SV1 having M4 as its sole member is created. SV1 is an internal virtual logical unit (IVLU) that is not accessible to initiating devices.

At the moment or time that member M4 is split from PV1, an online bit map O(B1) is created. Online bit map O(B1), a type of change log, maintains an indication of changes to the primary virtual logical unit from the moment that member M4 is split therefrom.

Figure 15:
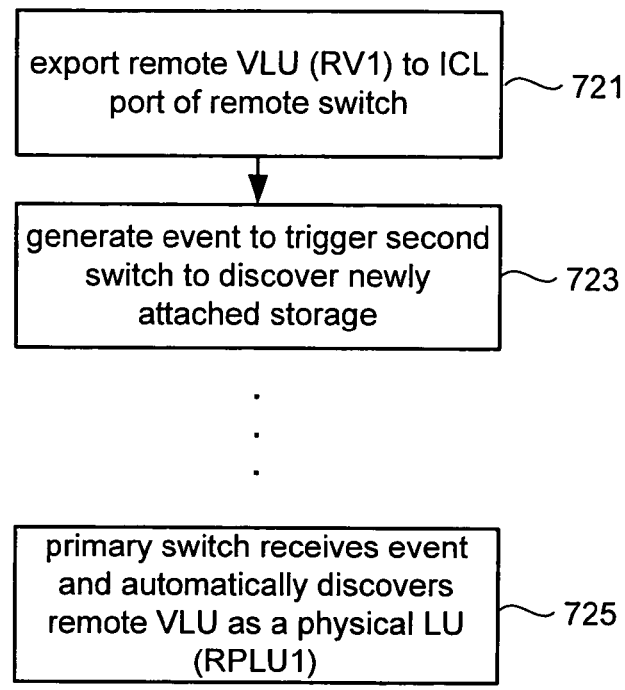
FIG. 15 is a flowchart depicting a process for exporting virtual logical units from a first switch as a physical logical unit to a second chassis.

The remote virtual logical unit VLU RV1 is exported to the primary chassis as a remote logical unit (referred to herein as a "remote physical logical unit") RPLU1 that will map to RV1. FIG. 15 is a flowchart depicting a method for exporting a virtual logical unit at a remote switch so that it can be discovered as a physical logical unit at a second switch. RV1 is provisioned or exported to the ICL port at the remote switch at step 721. Step 721 can include exporting RV1 to memory accessible at the ICL port. An event message is generated and passed across the ICL connection to the primary switch at step 723. The event message (e.g., an RSCN message in the fibre channel protocol) can alert the primary switch that new physical storage is connected to the primary switch at its ICL connection. RV1 provisioned at the ICL of the remote switch will appear exactly as physical storage attached to a port of the primary switch. Thus, the primary switch discovers RV1 as physical LU at step 725. The first switch can now create a member from RPLU1 just as it would from physical storage actually connected at the switch.

Referring again to FIG. 14a, a replication virtual logical unit RP1 is configured at primary switch 602 that will be used as the destination for copying data during replication. RP1 is configured with a single member MR1 including a single extent that maps to RPLU1 as the exported remote VLU RV1. The target or Flow ID information for MR1 can identify the port and linecard number of the ICL link at the primary switch so that data for the member is routed to RV1 at the remote switch. It will be appreciated by those of ordinary skill in the art that a multiple member replication VLU can be created and furthermore that any one of the members of the replication VLU can include more than one extent. However, in the example depicted in FIG. 14a, a single member VLU having a single extent associated with the exported remote VLU from the secondary chassis is all that is necessary to perform the underlying replication. RV1 and RPLU1 can be removed once replication is complete. In other embodiments, replication VLUs can be maintained in non-volatile memory such as memory 211 to be used in some later point in time replication. This can facilitate future replication and reduce the overhead of reprovisioning replication VLUs.

Box 716 in FIG. 14a depicts an exemplary indication or database entry relative to RPLU1 that is created or updated upon the exportation of RPLU1 being exported to the primary switch. A database 214 (FIG. 2) can be maintained within memory 211 at the primary switch to track information relative to the state of remote VLUs for primary virtual logical units provisioned at the primary switch. Database 214 can be duplicated across dual system control cards to facilitate high availability. If a remote physical logical unit is being used for the first time during a replication involving a selected primary VLU, a new entry for the RPLU is created in the database. If an RPLU has been used previously, its entry in the database is retrieved to determine the time of last replication in order to optimize the transfer of data to the remote VLU.

In FIG. 14a, RPLU1 is exported and used in the replication of PV1 for the first time. Accordingly, the switch creates a new entry 716 in the database for RPLU1. Entry 716 denotes that there is no known last relation of the exported physical logical unit with respect to the primary VLU by denoting this as a create new entry. The entry depicted in box 716 also includes a destination ID to identify the remote physical logical unit and a last time that a replication or volume copy was performed from the primary VLU to this remote physical logical unit. Entry 716 identifies RPLU1 as P1 and notes that there have been no replications to this RPLU by denoting the last time of copy as not applicable (N/A).

After creating replication VLU RP1 with mirror MR1 mapping to RPLU1 and creating the corresponding database entry, a volume copy is performed from the split VLU SV1 to the replication VLU PV1. Because this is the first time that a replication is being performed (as determined from the database) to RPLU1 from PV1, a complete volume copy from split member VLU SV1 to replication VLU RP1 is performed. As denoted in box 720, the data residing in remote VLU RV1 is invalid with respect to PV1 because there is no known reference of remote VLU RV1 with respect to primary VLU PV1. Accordingly, the type of operation to be performed is a complete volume copy. At the completion of the replication, the new data stored in remote VLU RV1 will be D0, corresponding to the data residing in PV1 prior to the split of member M4.

After the replication is complete, entry 716 is updated to indicate that the relation of RPLU1 with respect to PV1 is now known and that the last time PV1 was replicated to RV1 was at time t1. This will indicate that RV1 is synchronized with the data in PV1 as of time t1 when member M4 was split.

Figure 14B:
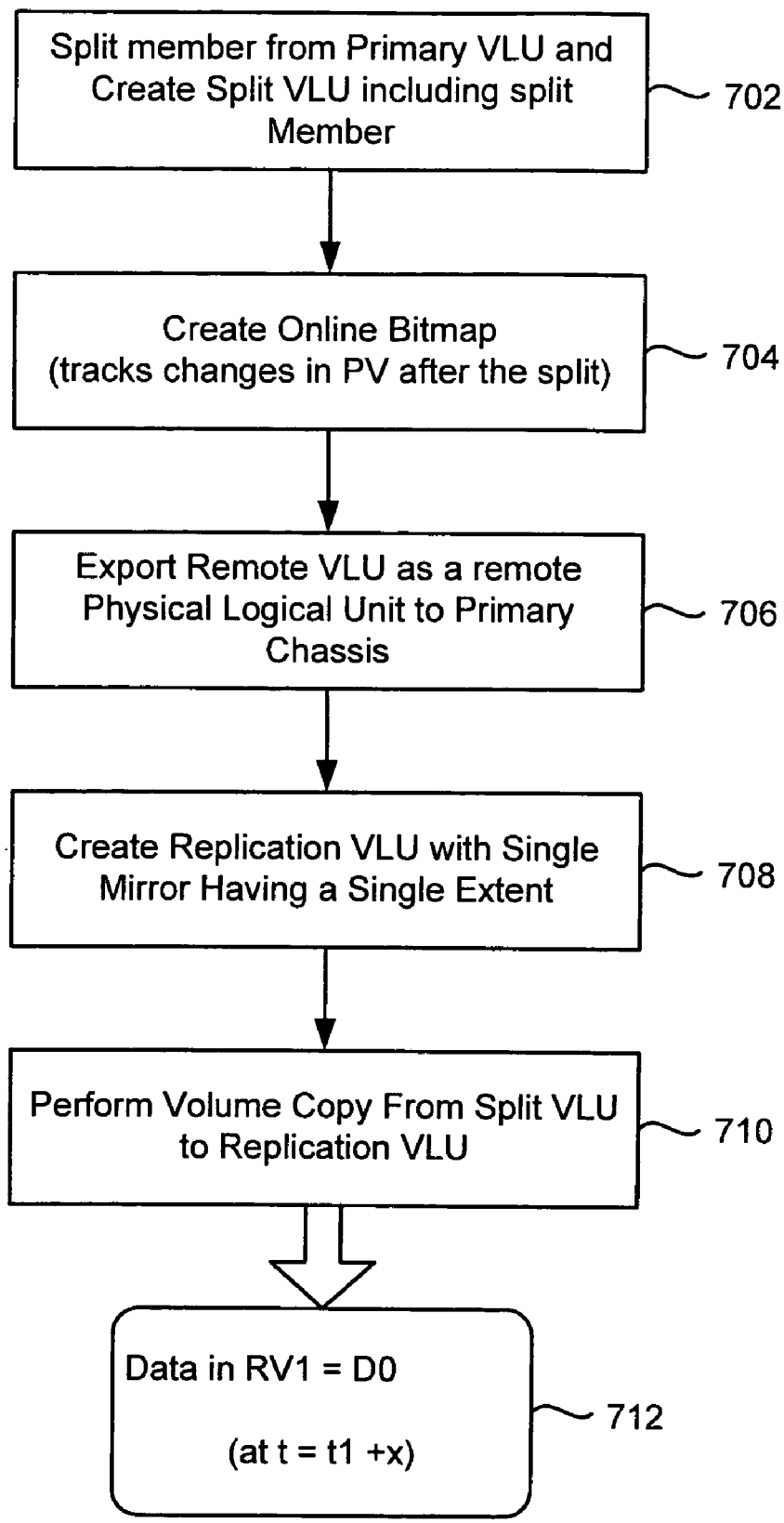
FIG. 14b is a flowchart depicting a replication operation in accordance with one embodiment.

FIG. 14b is a flowchart depicting an initial replication of a primary virtual logical unit to a remote virtual logical unit as described in FIG. 14a. A member of the primary virtual logical unit is split or removed from the primary VLU and a split virtual logical unit created that includes the split member at step 702. At the time the member is split at step 702, an online bitmap is created at step 704 to track changes made to the primary virtual logical unit after splitting the member. The remote VLU is exported from the remote switch to the primary switch at step 706. Step 706 can include exporting the remote VLU as a remote physical logical unit as previously described in FIG. 15. A replication VLU is created at step 708 and can include a single member having a single extent corresponding to the exported physical logical unit at step 706. After setting up the split VLU as a source IVLU for the replication and the replication VLU as a destination IVLU for the replication, a volume copy operation is performed to synchronize the data at the remote VLU with that of the primary VLU. The embodiment depicted in FIG. 14b represents an initial replication of the primary VLU to the remote VLU such that a complete volume copy is performed at step 710. Accordingly, all of the data residing in or associated with member M4 will be read and passed through the primary switch to the remote switch over an ICL link such that it is stored within the physical devices associated with the remote VLU.

As previously described, the transport of data through storage switches in accordance with embodiments can be performed at wire-speed without buffering the data within the storage switch. The use of local headers and associated target descriptors can remove the need to temporarily store data for intermediate processing at the switch. Accordingly, the primary switch can read the data from the appropriate physical devices attached thereto, convert it to write data, and provide the write data to an ICL connection without intermediate buffering of data within the switch.

Figure 16:
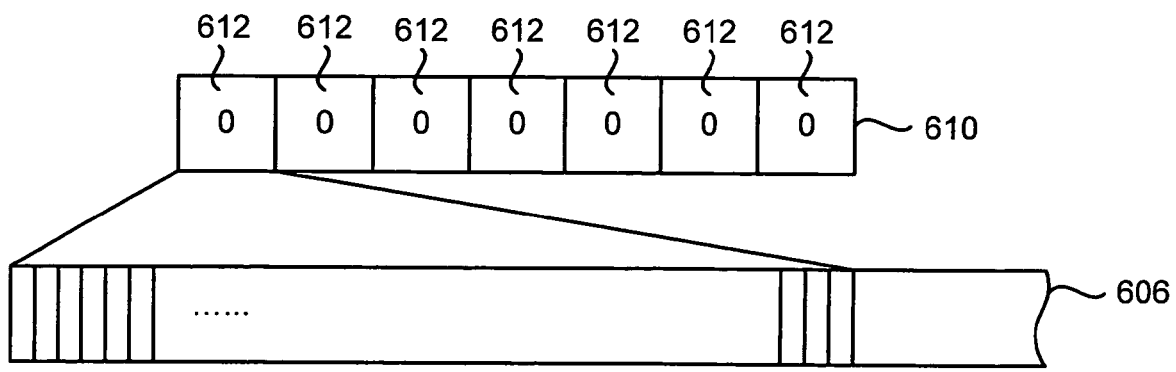
FIG. 16 depicts an exemplary bitmap in accordance with one embodiment.

FIG. 16 depicts an exemplary bit map such as online bit map O(B1). Bit map 610 includes a plurality of bits 612 (seven in the example provided in FIG. 16). Each bit 612 represents a number of blocks of the primary virtual logical unit. For example, each bit in bit map 610 may represent a group or chunk of blocks at the primary virtual logical unit. Any number of blocks, ranging from a single block to every block within a virtual logical unit, can be represented by a bit within a bitmap. For example, a terabyte size VLU may include $2^{31}$ blocks. 512 Kbytes of data which can represent 1024 blocks of the VLU may be represented by one bit such that the bitmap is about 256 Kbytes in size. For a VLU of about 64 Gbytes, a bit could be set up to represent 32 blocks of the VLU.

Bitmap 610 operates to provide replication of only that data (or a portion of data relating to such data) that has changed since the last replication. As depicted in FIG. 16, each bit within bit map 610 is set to zero. This indicates that there is no change within any of the blocks ranges represented by the bits since the last replication. If a block within the range denoted by the bit has changed since the last replication, the bit is changed from zero to one to indicate that a change occurred. It will be appreciated by those of ordinary skill in the art that numerous types of indications can be used in addition to and in place of using a zero or one to denote a change. When a subsequent replication is performed to the remote VLU, reference is made to the appropriate bit map to determine which groups of blocks need to be copied. If a bit in the bit map is set to one, the appropriate group within the primary virtual logical unit is identified and that group of blocks copied from the primary VLU to the remote VLU at the remote chassis.

Bit map 610 can be any size or range of sizes in accordance with various embodiments and desired implementations. The number of bits within bit map 610 can be increased to more precisely identify those groups of blocks within the primary VLU that have been modified since the last replication. As the size of bit map 610 increases, however, the amount of memory required to store the bit map also increases. In various implementations bit map 610 is maintained in some non-volatile memory (e.g., memory 211) within the storage switch to maintain persistence of the bitmap across reboots. Additionally, bitmap 610 will be copied into a faster memory, such as RAM $305_1$ within the storage switch during operation to provide for increased performance utilizing the bit map. Both sizes of these memories affect the maximum size of the bitmap that can or should be used.

In one embodiment, a dynamic algorithm is provided within the storage switch to optimize the selection of the size of bitmap 610. This algorithm can determine the size of the primary virtual logical unit as well as the size of the various memories within the switch (e.g., random access memory used to temporarily store the bitmap and non-volatile memory used to permanently store the bit map). Using the available resource information, the dynamic algorithm can choose an appropriate size for the bitmap in order to optimize performance while not occupying too much memory within the storage switch. In other embodiments, the size of bitmap 610 can be chosen by an administrator or user of the storage switch. Different scenarios and implementations may have different needs for different sizes of bit maps and an administrator can select an appropriate size relative to those considerations. For example in some implementations it may be more desirable to precisely identify only those blocks that have been changed to perform minimal amounts of replication. However, in other embodiments such may be less important and memory size within the storage switch be more important such that bit map 610 is chosen in a small size.

Figure 17A:
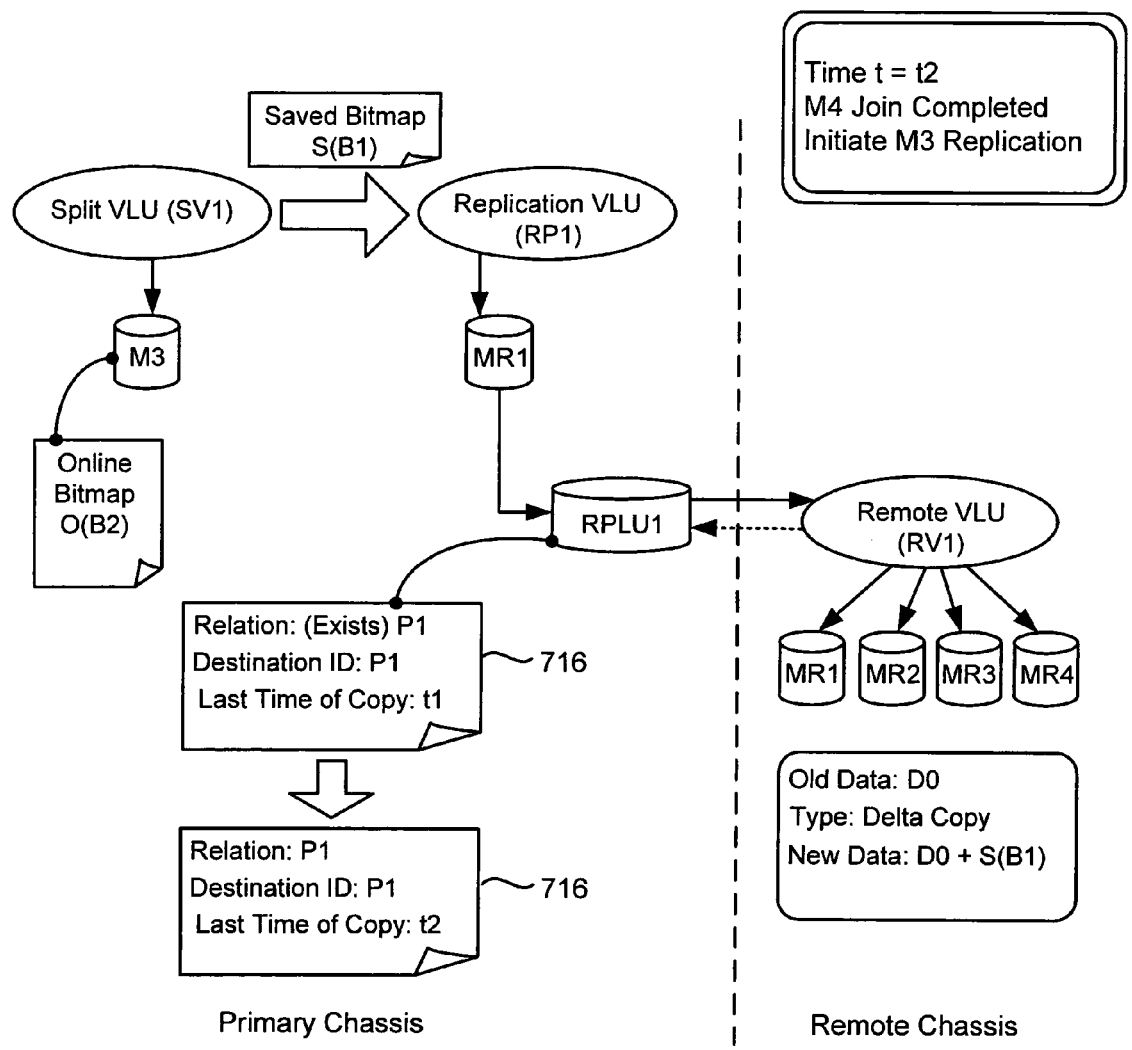
FIG. 17a is a block diagram of select components of a storage area network depicting a replication operation in accordance with one embodiment.

FIG. 17a depicts a subsequent replication to the remote chassis at some time following the first replication at time t=t1, depicted in FIGS. 14a and 14b. In FIGS. 16a it is assumed that split member M4 from the previous replication has completed its volume copy to RV1 and has initiated and joined back with the primary VLU PV1. Accordingly, at the beginning of the operation depicted in FIG. 17a.

Member M3 is split from primary VLU PV1 and a split virtual logical unit SV1 having M3 as its member created. It will be noted that because member M4 has rejoined PV1, any member of PV1 (including member M4) can be used as the split member. At the time of splitting member M3, online bit map O(B2) is created. Online bit map O(B2) maintains an indication of changes to primary VLU PV1 with respect to member M3. In other words, O(B2) will maintain an indication of changes made to PV1 from the time of splitting member M3. Along with splitting M3 and creating online bit map O(B2), the current instance of the active online bit map O(B1) is saved as bit map SB1. Saved bit map SB1 will represent changes in the primary virtual logical unit from the time of splitting M4 until the time of splitting M3. Or put another way, saved bitmap S(B1) will indicate changes to the primary VLU between time t1 when member M4 was split and time t2 when member M3 was split. This will also be an indication of the data that has been modified at the primary virtual logical unit since the last replication to remote VLU RV1.

The primary switch checks database 214 for an entry maintained with respect to RPLU1 to determine any relation information of physical logical unit RPLU1 to primary VLU PV1. Because remote VLU RV1 has been previously exported as RPLU1 and a replication performed with respect thereto, an entry 716 is discovered in this scenario denoted with the relation of existing P1. From entry 716, the primary switch determines that a last replication to RPLU1 occurred at time t1. Accordingly, the primary switch determines that a full volume copy to remote VLU RV1 is not necessary. The switch determines that RV1 need only be updated with changes made between time t1 and the present time t2. As previously described, such changes are indicated by saved bitmap S(B1), created upon splitting member M3.

A volume copy from split VLU SV1 to remote VLU RV1 is then performed using SB1 bit map to determine which data to transfer. After copying those blocks of primary VLU PV1 corresponding to the changed bits within saved bit map SB1, remote VLU RV1 will store data D0 plus that data indicated by SB1. After the replication of split number M3 is completed, entry 716 is updated to indicate the completed replication process. The relation and destination I.D. remain P1, relative to the exported physical logical unit from the remote chassis, and the last time of copy is updated to indicate that remote VLU RV1 was replicated with data from primary VLU PV1 at time t2.

Figure 17B:
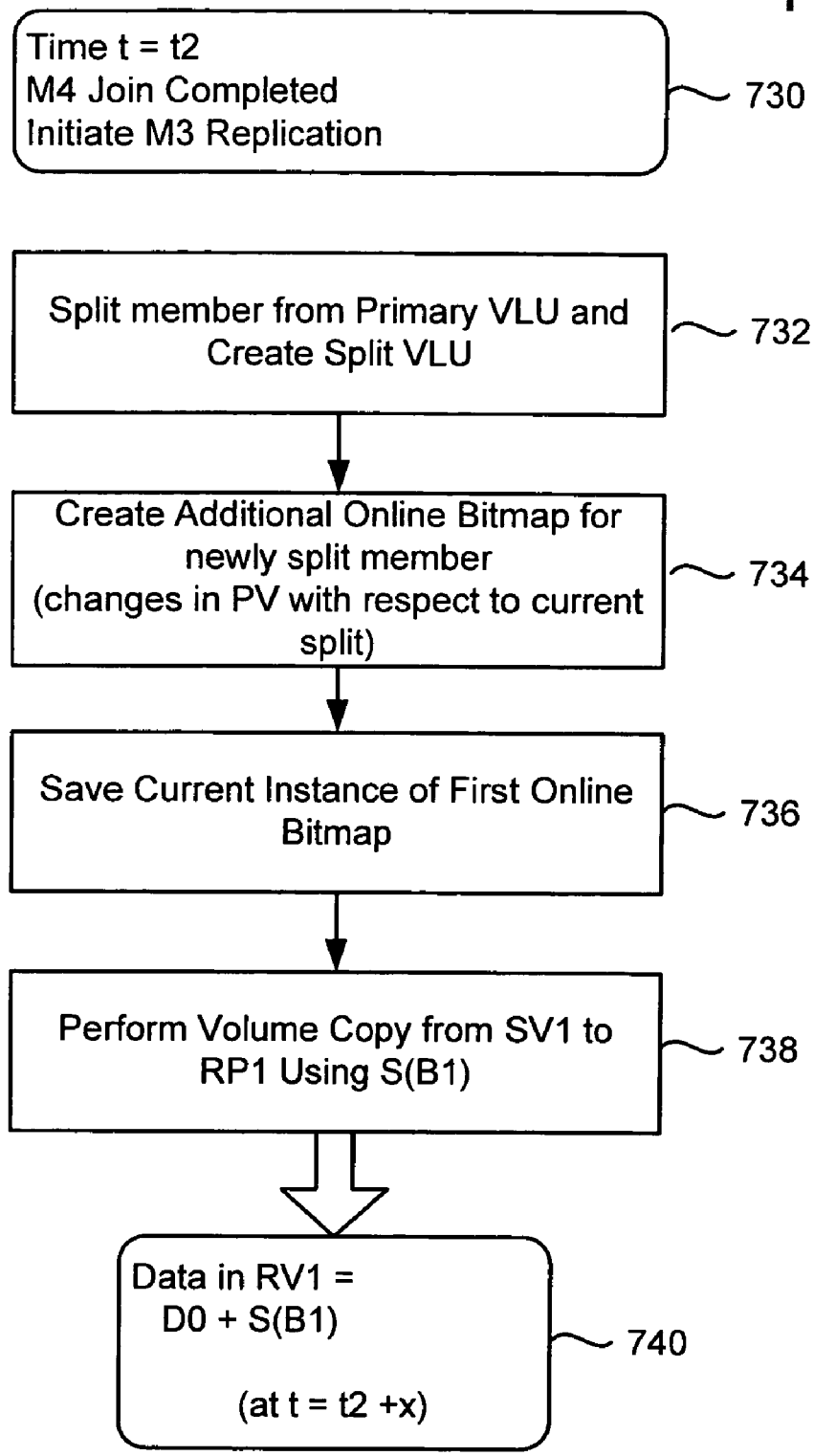
FIG. 17b is a flowchart depicting a replication operation in accordance with one embodiment.

FIG. 17b is a flowchart for performing an initial replication to a remote VLU as depicted in FIG. 17a. An member is split from the primary VLU and a split VLU created with the split member at step 732. A second online bitmap is created for the newly split member at step 734 to track changes in the primary VLU with respect to the current split. The current instance of the previously created online bitmap (e.g., O(B1)) is saved at step 736. The exportation of the remote VLU as depicted in steps 706 and 708 of FIG. 14b is not necessary if the replication RV1 is persisted at the primary VLU. A volume copy is performed from the split VLU to the replication VLU using the saved bitmap at step 742. In the example of FIG. 17a, RV1 will be storing D0 (from the original replication as depicted in FIG. 14a) and the changes indicated by S(B1) which represents changes to PV1 since the replication at time t=t1.

FIG. 18a depicts another exemplary replication process of primary VLU PV1 that is initiated prior to the completion of a preceding replication process. In the example depicted in FIG. 17a, the replication of primary VLU PV1 using split VLU SV1 and split member M4, as depicted in FIG. 14a, is still ongoing. The ongoing replication of PV1 using split VLU SV1 is illustrated in the top portion of the sheet of FIG. 17A. In the bottom portion of the page, the subsequent replication of PV1 using a second split member from PV1 is illustrated. At time t=t2, while the replication utilizing split member M4 is still ongoing, mirrored member M3 is split from primary VLU PV1. Split VLU SV2 is created with member M3 as its sole member. Upon splitting member M3 from PV1, a second online bit map O(B2) is created. Online bit map O(B2) is associated with split member M3 and marked as the latest or most current bitmap. Bitmap O(B2) maintains an indication of changes in PV1 relative to member M3 (i.e., relative to changes in PV1 since the split of member M3). Additionally, the current instance of online bit map O(B1) is saved as saved bit map SB2. Saved bit map SB2 will represent changes in the primary virtual logical unit between the split of member M4 at time t1 and the split of member M3 from PV1 at time t2.

In FIG. 18a, the replication of PV1 to the remote storage switch is performed utilizing a second remote virtual logical unit RV2. RV2 includes a single member MR5. It will be appreciated by those of ordinary skill in the art that remote VLU RV2 can include any number of members such as a 2, 4, 6 or more. Similar to remote VLU RV1, remote VLU RV2 is exported as a physical logical unit RPLU2 to the primary switch as depicted in FIG. 15. A replication VLU RP2 is created at the primary switch having a single member MR2 with a single extent mapping to RPLU2. Primary switch 602 will determine that this is the first instance of RPLU2 exported to the primary switch and thus, will create a new entry 718 in database 214 to maintain state information for RPLU2. Because this is the first instance of RPLU2, entry 718 indicates that the relation of this physical logical unit and database entry is new, the destination ID is P2, and the last time of copy is not applicable. After successfully creating replication VLU RP2 a complete volume copy from split member SV2 to replication VLU RP2 is performed (because this is the first time primary VLU PV1 is replicated to remote VLU RV2). After completion of the replication, the data in remote VLU RV2 will be D0 (data in PV1 when M4 split at t=t1) plus the data represented by bit map SB1 (changes to PV1 between the split of member M4 at time t1 and member M3 at time t2). Upon completion of the replication operation, entry 718 is updated to indicate that the relation is to physical logical unit P2, the destination I.D. is P2, and the last time of copy or replication was t2.

Figure 18B:
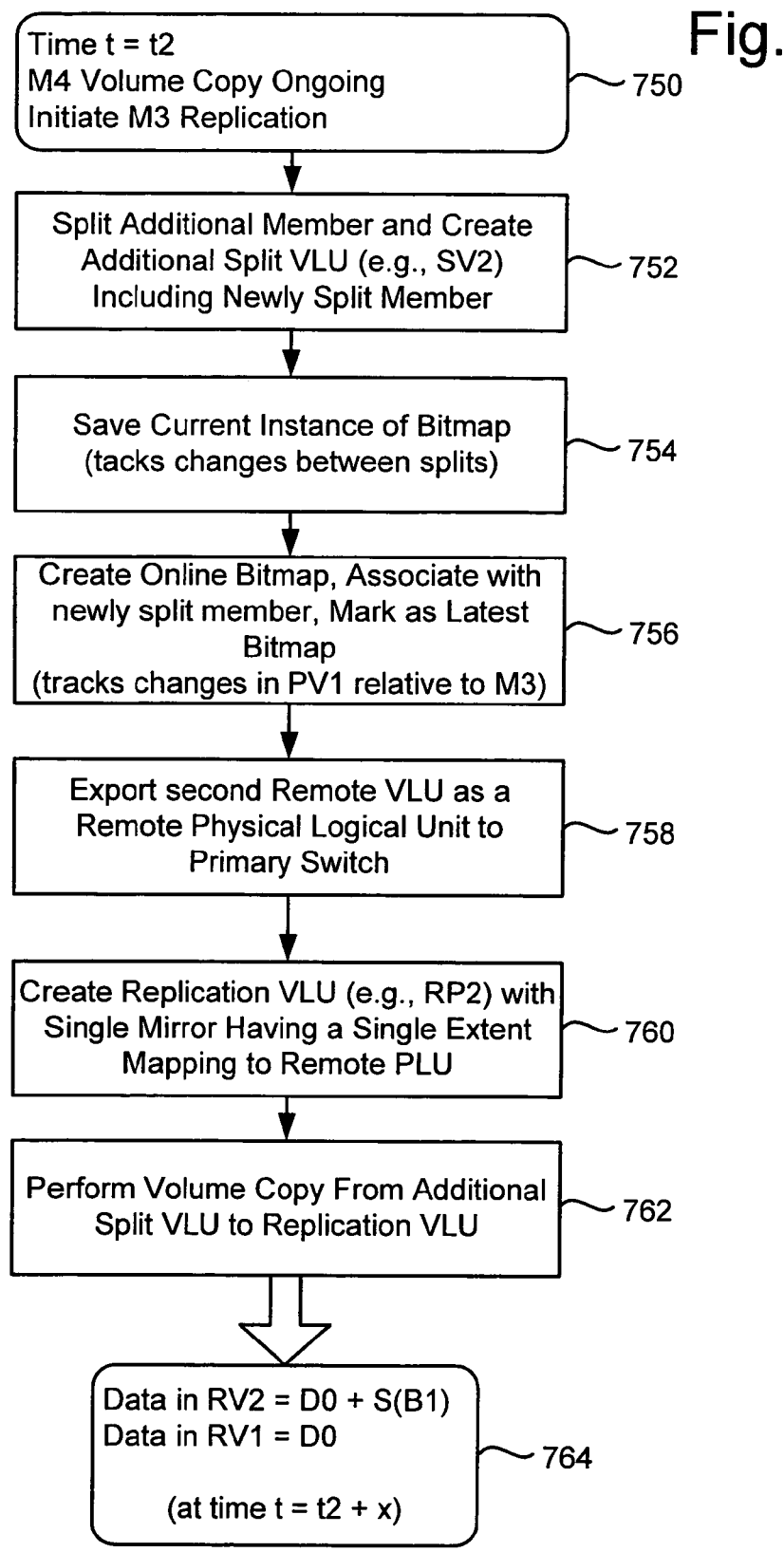
FIG. 18b is a flowchart depicting a replication operation in accordance with one embodiment.

FIG. 18b is a flowchart depicting the simultaneous replication of a primary VLU with another replication of the same primary VLU, such as described with respect to FIG. 18a. As indicated in box 750, the flowchart is representative of a beginning time of t=t2, following an initial replication of the primary VLU at a time t=t1. As further indicated, the first replication operation, in the present example M4, is still ongoing and a second replication utilizing member M3 is initiated. At step 752, an additional member such as member M3 is split from the primary VLU and a split VLU such as SV2 created with M3 as a member. At step 754, the current instance of the online bit map O(B1) is saved as a saved bit map SB1. Bit map SB1 will indicate changes in the primary VLU between the split operations (between time t=t1 and time t=t2). At step 756, an additional online bit map O(B2) is created, associated with member M3, and marked as the latest bit map. O(B2) will track changes in the primary virtual logical unit relative to the split of member M3.

A second remote VLU (e.g., RV2) is exported as a physical logical unit (e.g., RPLU2) to the primary chassis at step 758. At step 760, a second replication virtual logical unit (e.g., RP2) is created. RP2 can include RPLU2 as a single extent in a single mirror MR2 provisioned for the replication VLU. After provisioning RP2, a complete volume copy of split VLU SV2 to replication VLU RP2 is performed because this is the first time primary VLU is being replicated to remote VLU RV2. As indicated in box 764 with respect to the example of FIG. 18a, the data residing in remote VLU RV2 will be D0 plus the data represented by the saved bit map SB1 upon successful completion of both the M4 replication, begun at time t=t1, and the M3 replication, begun at time t=t2. The data in RV1 will be equal to D0, resulting from the replication at time t=t1. As indicated in box 754, this will be the status of each of the remote VLUs at a time equal to t2 plus sometime x required for each of the replication processes to complete.

Figure 19A:
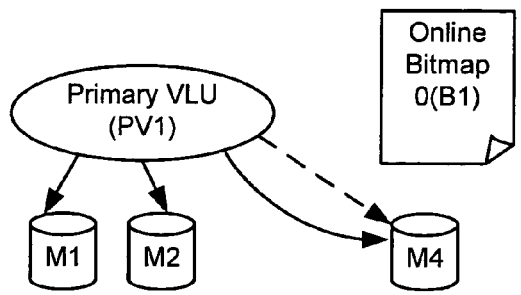
FIG. 19a is a block diagram of select components of a storage area network depicting a join operation for a split member in accordance with one embodiment.
Figure 19B:
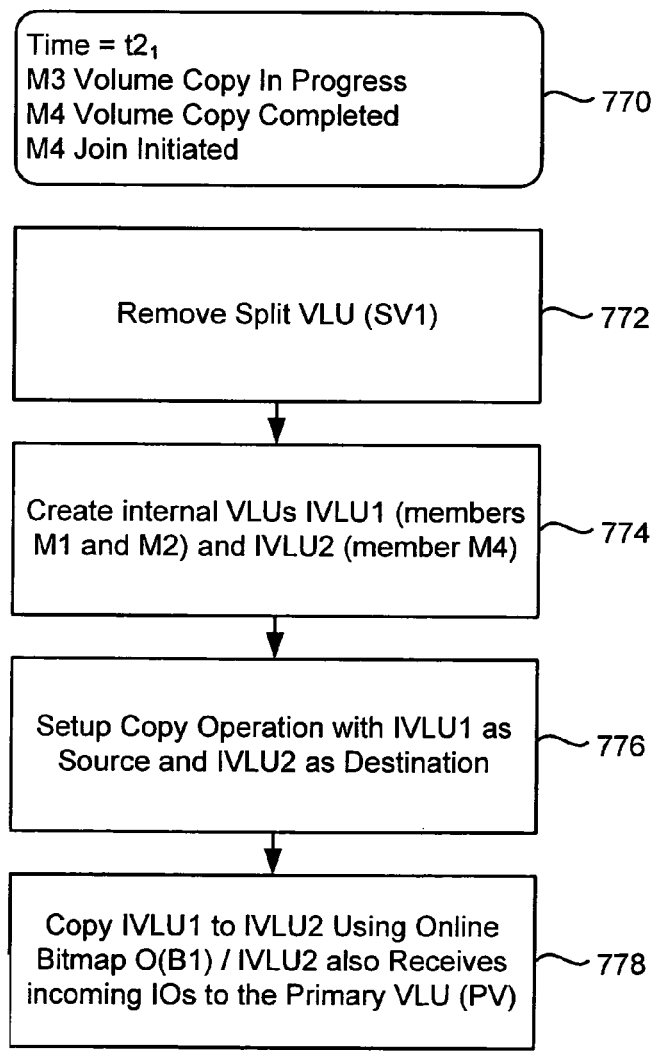
FIG. 19b is a flowchart depicting a join operation for a split member in accordance with one embodiment.

FIGS. 19a and 19b depict a join operation that can be used to join member M4 back to the primary VLU PV1. The rejoin operation for M4 can begin at a time equal to $t2_1$. At time $t2_1$ the M3 volume copy replication process is still in progress, the M4 volume copy operation has completed, and a join of M4 back to primary VLU PV1 has been initiated, as indicated in box 770. The join operation for member M4 begins by removing or deleting the split VLU SV1 at step 772. At step 774, two internal virtual logical units are created at the primary chassis. These virtual logical units can be provisioned at any line card of the storage switch (and in an associated memory) and will remain internal to the storage switch and not be accessible to external initiating devices. The internal virtual logical units are created for the sole purpose of joining member M4 back to the primary VLU. A first internal virtual logical unit, IVLU1, can include as members M1 and/or M2, and a second virtual logical unit, IVLU2, can include as a single member M4. IVLU1 and IVLU2 can be provisioned at the same line card or at different line cards. After provisioning each of the internal virtual logical units, a copy operation with IVLU1 as the source and IVLU2 as the destination is setup at step 776. Setting up the copy operation can include such steps as sending a write request to the destination IVLU to receive a transfer ready signal and then providing a transfer ready signal to the source IVLU to ensure that the destination physical targets are able to receive the data prior to beginning reading of the data from the source physical targets. After setting up the copy operation to 776, the data of IVLU1 is copied to IVLU2 in accordance with the data identified from online bit map O(B1). For more information regarding synchronization performed with two IVLUs, see co-pending U.S. patent application Ser. No. 10/837,248, entitled ONLINE INITIAL MIRROR SYNCHRONIZATION AND MIRROR SYNCHRONIZATION VERIFICATION IN STORAGE AREA NETWORKS. Online bitmap O(B1) has remained active since the initial split of member M4 from PV1. Accordingly, all updates to PV1 from this time are represented in O(B1). Online bit map O(B1) is kept active during the join operation such that changes to the primary VLU are updated to member M4 during the join operation. Additionally, in addition to the data copied from IVLU1 to IVLU2, IVLU2 (and IVLU1) will receive incoming input/output requests to the primary VLU PV1. In FIG. 19a, these are represented by the dotted line between PV1 and member M4 while the copy of data from IVLU1 to IVLU2 is represented by the solid line.

Figure 20:
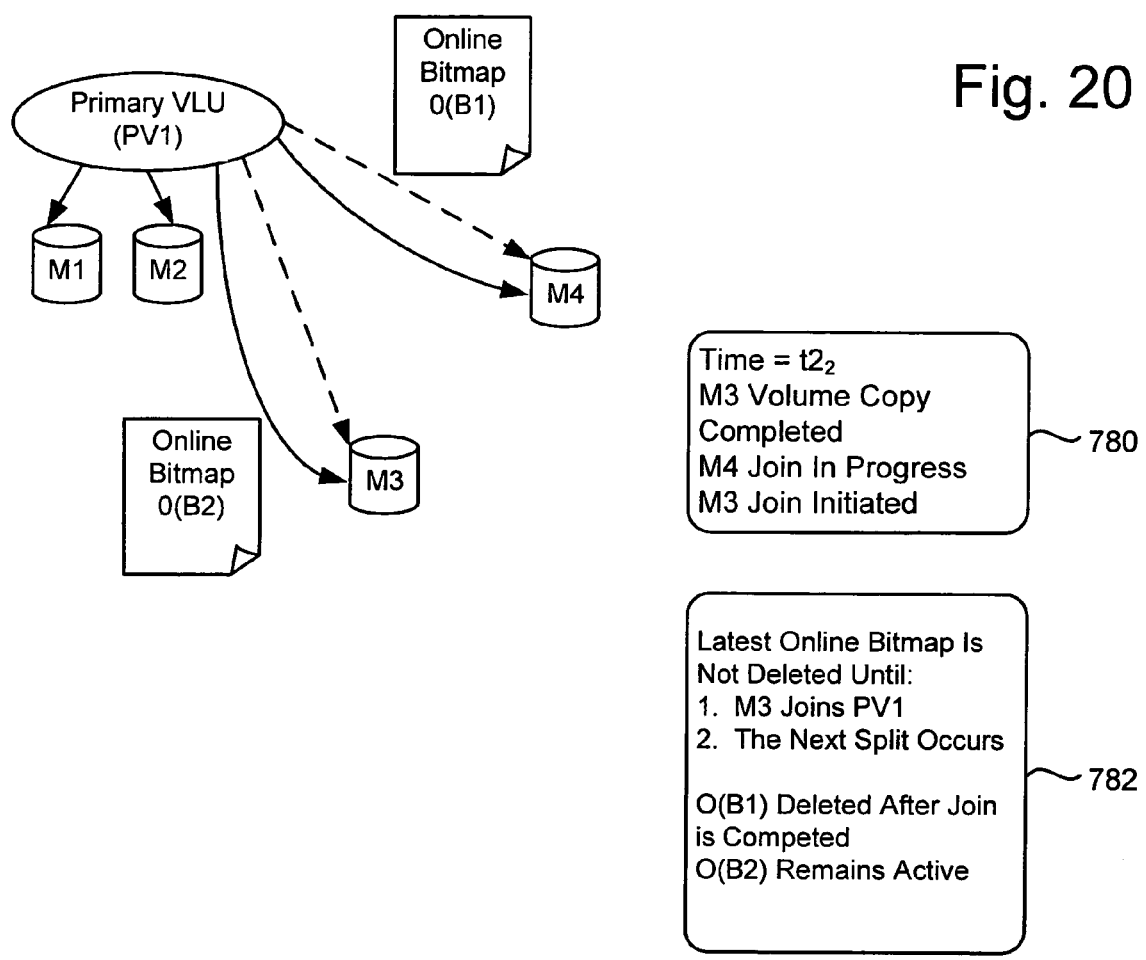
FIG. 20 is a block diagram of select components of a storage area network depicting a join operation for multiple split members in accordance with one embodiment.

FIG. 20 is a block diagram depicting various components of the primary chassis 602 for a join operation of member M3 at a time $t=t2_2$, subsequent to initiating the join operation for member M4 at time $t2_1$. As indicated in box 780, the volume replication process for member M3 has been completed, the join of member M4 back to primary VLU PV1 has been initiated and remains in progress, and the join operation for member M3 has been initiated. The join operation for member M3 can be performed simultaneously with the join operation of M4. Because of the maintenance of multiple bitmaps to indicate various time periods and changes made to PV1 relative to these time periods, the individual requirements for joining each distinct member is known.

In order to join member M3 to primary VLU PV1, split VLU SV2 is removed. Internal virtual logical units (e.g., IVLU3 having members M1 and/or M2 and IVLU4 having member M3) can be created. A copy operation with IVLU3 as a source and IVLU2 as a destination can be set up and the data copied from IVLU1 to IVLU2. In the case of joining member M3, however, the online bit map O(B2) will be used rather than online bit map O(B1). O(B2) represents changes to the primary virtual logical unit from the moment of splitting M3 and thus contains all information to synchronize M3 with PV1. As with online bit map 0(B1), online bit map 0(B2) stays active during the process in order to keep the information at member M3 up to date with operations performed on the primary virtual logical unit. Furthermore, as with member M4, input/output requests to the primary VLU occurring during the join operation will be forwarded to member M3 in order to maintain synchronization with the primary VLU.

As indicated in box 782, the latest bit map or online bit map is not deleted until the latest split member from the primary virtual logical unit is rejoined with the primary virtual logical unit and a subsequent split occurs. Accordingly, in the example depicted in FIG. 20, online bit map O(B1) is deleted after the join operation of member M4. Because member M4 has joined the primary virtual logical unit and a next split has occurred (the split of member M3 at time t=t2), O(B2) can be maintained as the latest bitmap and the maintenance of O(B1) is unnecessary. Online bit map O(B2) will remain active after the join of member M3 to primary VLU PV1 because a subsequent split or a next split has not occurred following the split of member M3. In this manner, an online bit map to track changes to the primary VLU since the last replication operation to a remote VLU is maintained. This information can be used in a subsequent replication operation as will be described hereinafter.

Figure 21B:
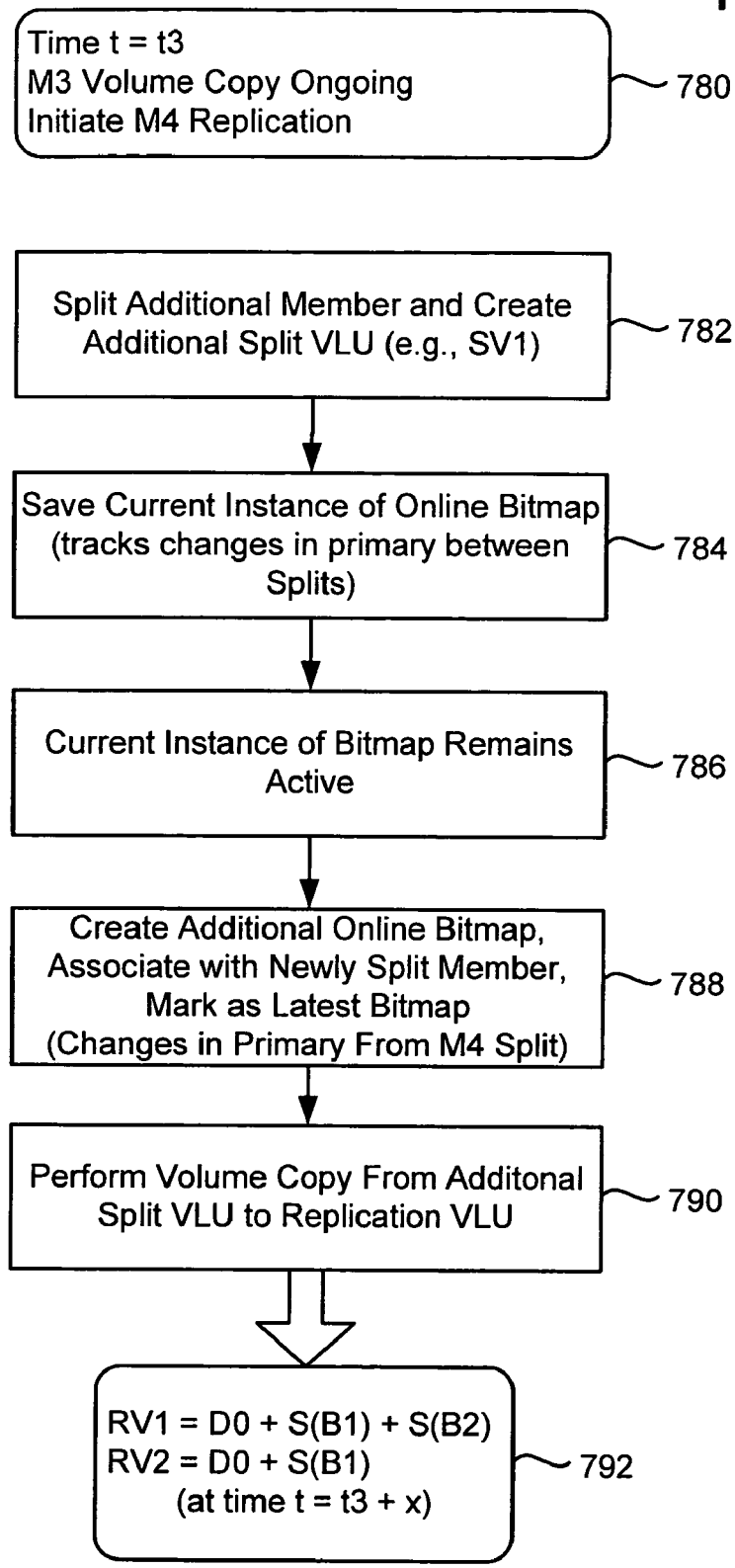
FIG. 21b is a flowchart depicting a replication operation in accordance with one embodiment.

FIGS. 21a and 21b depict a subsequent replication operation of primary virtual logical unit PV1 at a time t=t3, which can follow the join of member M4 at time $t2_1$ as depicted in FIGS. 19a and 19b. As noted in box 620, the assumptions relative to FIG. 21a and the replication depicted therein are that the replication operation of member M3 to remote VLU RV2 is still ongoing. This can be the replication operation involving member M3 and split VLU SV2 as depicted in FIGS. 17a and 17b. The top half of FIG. 21a depicts the ongoing replication of member M3 utilizing split VLU SV2 for replication to remote VLU RV2.

In the lower portion of the page, the newly initiated replication involving member M4 is depicted. Member M4 is split from primary VLU PV1 to create a split VLU SV1 having M4 as its sole member. Upon splitting member M4 from primary VLU PV1, an online bit map O(B3) is created to track changes relative to the primary virtual logical unit following the split of member M3. Furthermore, the current instance of the latest online bit map (for example, O(B2) resulting from the replication depicted in FIGS. 17A and 17B) is saved as saved bit map SB2. Saved bit map SB2 will represent changes in the primary virtual logical unit between the splits involving member M3 at time t=2 and member M4 at the present time t=t3. Online bit map O(B2) will remain active to continue tracking changes relative to the primary VLU with respect to split member M3. As previously described, online bit map O(B2) will remain active until M3 is joined back to the primary VLU and a subsequent split operation has occurred.

In FIG. 21a, member M4 is replicated to remote VLU RV1. It should be noted that the replication in FIG. 21a could involve a third remote VLU to create a third point in time replicate rather than using RV1. Remote VLU RV1 is already-provisioned at the primary switch as RPLU1 but could be recreated in other embodiments. The primary chassis will check the database containing information regarding the state of exported physical logical units from the remote chassis. In the example of FIG. 21a, the primary chassis determines that a relation exists for RPLU1 in the database and that the last time of copy to this physical logical unit from the primary VLU was time t1. Accordingly, the primary chassis determines that remote VLU RV1 is behind primary VLU PV1 by two saved bit maps (or two split operations) utilizing the time stamp of t1. In this case, primary chassis 602 determines that the last replication of remote VLU RV1 last replication was at time t1 when data D0 was copied from split VLU SV1 and member M4 to the remote VLU RV1. Thus, the primary chassis determines that remote VLU RV1 has not been updated or replicated to include the data changes represented by saved bit maps SB1 (time between t1 and t2) and SB2 (time between t2 and t3).

A volume copy operation is performed from split VLU SV1 to replication VLU RP1 utilizing saved bit maps S(B1)

and S(B2). S(B1) and S(B2) can be merged to represent the changes to PV1 between t1 and t3. Accordingly, remote VLU RV1 is updated to include all changes to the primary virtual logical unit since its last replication at time t1. At the end of a successful replication utilizing member M4, remote VLU RV1 will contain new data D0 plus the data represented by SB1 and SB2. After completing a successful replication, entry 716 for RPLU1 will be updated to indicate that the last time of last copy or replication to remote VLU RV1 was t3.

FIG. 21b is a flowchart depicting an exemplary process that can be performed for a subsequent replication while a previous replication is ongoing, such as depicted in FIG. 21a. Box 780 indicates that the present time is t=t3, that an ongoing volume or replication of copy of member M3 is occurring, and that the replication of a member M4 to a remote VLU has been initiated.

At step 782, an additional member (e.g., M4) is split and a split virtual logical unit (e.g., SV1) created with M as its sole member. At step 784, the current instance of the latest online bit map (e.g., O(B2)) is saved as a saved bit map (e.g., SB2) to represent changes in the primary virtual logical unit between the last two splits (i.e., between times t=t1 and t=t2). Step 786 indicates that the online bit map will remain active because its associated split member, M3, has not been rejoined to the primary VLU.

At step 788 a new online bit map (e.g., O(B3)) is created, associated with member M4, and marked as the latest bit map. The latest bitmap can track changes in the primary virtual logical unit from time t=t3 (from the split of member M4). After creating the split VLU, a volume copy operation is performed from the split VLU to the replication VLU. The volume copy operation will utilize saved bit maps both of the saved bitmaps (e.g., SB1 and SB2) to copy only those chunks of blocks denoted as having been changed since the last replication involving the remote VLU. Upon successful completion of the replication operation utilizing member M4, the data in remote VLU RV1 will be updated to include data D0 plus that data represented by SB1 plus SB2. Upon successful replication of the operation involving split member M3, the data residing in remote VLU RV2 will be D0 plus SB1. This is indicated as being at time t=t3 plus x to indicate the time required to complete each replication.

As depicted in FIGS. 17a through 21b distinct remote VLUs RV1 and RV2 are provisioned at the remote chassis and exported as physical logical units to the primary chassis in order to provide for a replication operation thereto. Accordingly, the two remote virtual logical units represent distinct point in time replications of the primary virtual logical unit to the remote chassis. That is to say, each remote VLU will include data indicative of a replication at a given point in time. Accordingly, each of the remote VLUs will contain differing sets of data. For example, as concluding with the example presented in FIGS. 21a and 21b, remote VLU RV1 will be storing data D0 plus the data represented by the saved bit maps SB1 plus SB2, while remote VLU RV2 will be storing the data D0 plus that represented by bit map SB1.

In accordance with one embodiment, and as depicted in FIG. 22, a resynchronization operation can be performed to synchronize the two remote VLUs to contain the same replicated data. Although in some cases it will be desired to have distinct point in time replications, such resynchronization can provide extended functionality to provide a single set of replication data at a remote site while at the same time providing distinct remote VLUs to perform simultaneous replication operations thereto. In box 802 of FIG. 22, it is indicated that remote VLU RV1 is storing D0 plus SB1 plus SB2 while remote VLU RV2 is storing D0 plus SB1. Thus, remote VLU RV1 is storing a more current set of data than remote VLU RV2. Thus RV2 will be resynchronized to include the same data as provided in remote VLU RV1.

RV1 is removed as a remote VLU and exported as a physical logical unit RPLU1 to the primary chassis and remote VLU RV2 is removed as a remote VLU and exported to the primary chassis as RPLU2. The primary chassis can take advantage of the saved bit map at the primary chassis and these exported physical logical units in order to perform a resynchronization operation for the remote VLUs.

An IVLU, IVLU2, is established as the destination virtual logical unit and an IVLU, IVLU1, is established as the source virtual logical unit. IVLU2 includes a single member M2 representing RPLU2 and IVLU1 includes a single member M3 representing RPLU1. IVLU1 is volume copied to IVLU2 in accordance with the changes identified in S(B2). The volume copy operation can utilize saved bit map S(B2), which represents changes in the primary virtual logical unit between the split of member M3 at time t=t2 and the split of member M4 at time t=t3. At some time following time t=t2, remote VLU RV2 was replicated to include data D0 plus SB1. Likewise, at some time following t=t3, the primary VLU was replicated to remote VLU RV1 such that RV1 contains data D0 plus the data represented by SB1 and SB2. The primary chassis can resolve the difference in the time stamps for RPLU1 (last copy=t2) and RPLU2 (last copy=t3) in database 214 to determine that saved bit map SB2 should be utilized to synchronize remote VLU RV2 with remote VLU RV1. Accordingly, source IVLU1 is copied to destination replication IVLU2 utilizing the stored bit map SB2 to only copy those groups of blocks indicated as having been modified since the last replication to remote VLU RV2.

Because the destination and configuration information for the exported physical logical units indicate that the corresponding physical destinations reside exclusively within the remote chassis, the data is not actually transferred through the primary chassis in order to complete the resynchronization. Although the primary chassis can be functionally involved to setup and initiate the volume copy (e.g., providing each remote physical logical unit as a destination or source and acting as an initiator to read data from one physical logical unit and copy it to the other), the data does not actually have to be transferred into the primary chassis to accomplish such functionality. The primary chassis will issue read commands to the source RPLU which will be relayed across the inter chassis link to the remote VLU to copy the data from the associated physical targets corresponding to the members of the remote VLU. The write commands issued to the destination RPLU will simply route the data from the source remote VLU (in this case RV1) all within the remote chassis to the destination remote VLU RV2 without transferring the data within the primary chassis.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto and their equivalents.

What is claimed is:

1. A storage switch for accessing virtual targets, comprising:
   at least one virtual unit configuration including a plurality of blocks and at least one member;
   at least one split virtual unit configuration including said at least one member when said at least one member is split from said at least one virtual unit configuration;
   at least one change log indicating changes to said plurality of blocks since a last replication of said at least one virtual unit configuration to a remote location, and indicating changes to said plurality of blocks since a last time said at least one member was split from said at least one virtual unit configuration; and
   at least one replication virtual unit configuration including a first member having a first extent, said first extent corresponding to an exported unit configuration from a second storage switch, said exported unit configuration corresponding to a remote virtual unit configuration provisioned at said second storage switch.

2. The storage switch of claim 1, wherein:
   said at least one change log includes a plurality of bits, wherein each of said bits represents a corresponding group of blocks of said at least one virtual unit configuration.

3. The storage switch of claim 2, wherein:
   each of said bits include a first state to indicate a change to said corresponding group of blocks since said last replication and a second state to indicate no change to said corresponding group of blocks since said last replication.

4. The storage switch of claim 1, wherein:
   a replication of said at least one virtual unit configuration includes copying data identified by said first change log from said at least one split unit configuration to said at least one replication virtual unit configuration.

5. The storage switch of claim 1, wherein:
   said at least one virtual unit configuration includes at least a first member and a second member;
   said at least one change log is at least one online change log indicating changes to said plurality of blocks since a last time said first member was split from said at least one virtual unit configuration; and
   said storage switch further comprises at least one saved change log indicating changes to said plurality of blocks between said last time said first member was split and a last time said second member was split from said at least one virtual unit configuration.

6. The storage switch of claim 5, wherein:
   said at least one saved change log is a version of said at least one online change log saved at said last time said second member was split from said at least one virtual unit configuration.

7. The storage switch of claim 1, wherein:
   said at least one virtual unit configuration includes at least a first member;
   said at least one change log is at least one online change log indicating changes to said plurality of blocks since a first time said first member was split from said at least one virtual unit configuration; and
   said storage switch further comprises at least one saved change log indicating changes to said plurality of blocks between said first time said first member was split and a second time said first member was split from said at least one virtual unit configuration.

8. The storage switch of claim 1, wherein:
   the storage switch is a first storage switch, said first storage switch further comprising:
   a first internal virtual unit configuration having a member with an extent corresponding to a first exported unit configuration of a first remote virtual unit configuration at a second storage switch, said at least one virtual configuration having been replicated to said first remote virtual unit configuration at a first time, and
   a second internal virtual unit configuration having a member with an extent corresponding to a second exported unit configuration of a second remote virtual unit configuration at said second storage switch, said at least one virtual configuration having been replicated to said second remote virtual unit configuration at a second time;
   said at least one change log indicates changes to said plurality of blocks between said first time and said second time; and
   said first remote virtual unit configuration is synchronized with said second remote virtual unit configuration by copying data identified by said at least one change log from said second internal virtual unit configuration to said first internal virtual unit configuration.

9. The storage switch of claim 8, wherein:
   said data identified by said at least one change log is copied to said first remote virtual unit configuration from said second virtual unit configuration without passing through said first storage switch.

10. The storage switch of claim 1, further comprising:
    a database including at least one entry identifying a time of a last replication to said remote virtual unit configuration.

11. The storage switch of claim 1, wherein:
    said at least one change log is at least one bitmap.

12. A method of replicating virtual targets, comprising:
    providing a change log at a storage switch to indicate changes to a first virtual unit configuration having a plurality of blocks, said first virtual unit configuration including at least one member
    splitting a first member from said first virtual unit configuration;
    creating a split virtual unit configuration having said first member as a member;
    replicating data from said first virtual unit configuration to a remote virtual unit configuration using said change log;
    importing another unit configuration corresponding to said remote virtual unit configuration, and
    creating a replication virtual unit configuration having a member with an extent corresponding to said other unit configuration;
    wherein said replicating data from said first virtual unit configuration includes copying data from said split virtual unit configuration to said replication virtual unit configuration in accordance with said change log, and said providing a change log includes creating said change log when said first member is split, said change log indicating changes to said first virtual unit configuration after said splitting.

13. The method of claim 12, wherein:
    said split virtual unit configuration is a first split virtual unit configuration;
    said change log is a first change log; and
    said method further comprises:
    splitting a second member from said first virtual unit configuration;

creating a second split virtual unit configuration having said second member as a member; and providing an additional change log when said second member is split, said additional change log indicating changes to said first virtual unit configuration after said step of splitting said second member.

14. The method of claim 13, further comprising:

creating a saved change log by saving a version of said first change log when said second member is split, said saved change log indicating changes to said first virtual unit configuration between splitting said first member and splitting said second member.

15. One or more processor readable storage devices having processor readable code embodied on said one or more processor readable storage devices, said processor readable code for programming one or more processors to perform a method comprising:

providing a change log at a storage switch to indicate changes to a first virtual unit configuration having a plurality of blocks, said first virtual unit configuration including at least one member splitting a first member from said first virtual unit configuration;

creating a split virtual unit configuration having said first member as a member;

replicating data from said first virtual configuration to a remote virtual unit configuration using said change log;

importing another unit configuration corresponding to said remote virtual unit configuration, and creating a replication virtual unit configuration having a member with an extent corresponding to said other unit configuration;

wherein said replicating data from said first virtual unit configuration includes copying data from said split virtual unit configuration to said replication virtual unit configuration in accordance with said change log, and said providing a change log includes creating said change log when said first member is split, said change log indicating changes to said first virtual unit configuration after said splitting.

16. One or more processor readable storage devices according to claim 15, wherein:

said split virtual unit configuration is a first split virtual unit configuration;

said change log is a first change log; and said method further comprises:

splitting a second member from said first virtual unit configuration;

creating a second split virtual unit configuration having said second member as a member; and providing an additional change log when said second member is split, said additional change log indicating changes to said first virtual unit configuration after said step of splitting said second member.

17. A storage switch, comprising:

at least one first virtual unit configuration including at least one member;

a split virtual unit configuration including said at least one member when split from said at least one first virtual unit configuration; and a replication virtual unit configuration including a member corresponding to a first unit configuration imported from a remote storage switch, said first unit configuration corresponding to a remote virtual unit configuration at said remote storage switch.

18. The storage switch of claim 17, wherein:

said at least one virtual unit configuration is replicated to said remote virtual unit configuration by copying data from said split virtual unit configuration to said replication virtual unit configuration.

19. The storage switch of claim 17, wherein:

said switch creates said split virtual unit configuration when said at least one member is split from said at least one virtual unit configuration.

20. The storage switch of claim 17, further comprising:

a communications link to said remote storage switch.

21. The storage switch of claim 17, wherein:

said at least one first virtual unit configuration is at least one first mirrored virtual unit configuration;

said at least one member is at least one mirrored member of said at least one first virtual unit configuration.

22. The storage switch of claim 17, further comprising:

a database identifying a last time of replication from said first virtual unit configuration to said remote virtual unit configuration at said remote storage switch.

23. A method of replicating virtual targets, comprising:

splitting a first member from a first virtual unit configuration;

creating a split virtual unit configuration including said first member;

importing another unit configuration corresponding to a remote virtual unit configuration; and creating a replication virtual unit configuration including a member corresponding to said other unit configuration.

24. The method of claim 23, further comprising:

copying data from said split virtual unit configuration to said replication virtual unit configuration.

25. The method of claim 24, wherein:

said step of copying data includes copying selected data from said split virtual unit configuration in accordance with a change log indicating changes to said first virtual unit configuration since a last replication to said remote virtual unit configuration.

26. The method of claim 23, wherein:

said step of importing said first unit configuration includes exporting said remote virtual unit configuration as said first unit configuration.

27. The method of claim 23, further comprising:

creating a first change log when said first member is split from said first virtual unit configuration, said first change log indicates changes to said first virtual unit configuration since said step of splitting.

28. The method of claim 27, further comprising:

splitting a second member from said first virtual unit configuration subsequent to said step of splitting said first member;

creating a second change log when said second member is split;

saving a version of said first change log as a first saved change log when said second member is split, said first saved change log indicating changes to said first virtual unit configuration between splitting said first member and said second member.

29. The method of claim 28, further comprising:

replicating said first virtual unit configuration to said remote virtual unit configuration by copying data from said second member to said replication virtual unit configuration in accordance with said changes to said first virtual unit configuration between splitting said first member and said second member as indicated by said first saved change log.

30. The method of claim 28, further comprising:
importing an additional unit configuration corresponding to an additional remote virtual unit configuration;
creating an additional replication virtual unit configuration including a member corresponding to said additional unit configuration; and
replicating said first virtual unit configuration to said additional remote virtual unit configuration by copying data from said second member to said additional replication virtual unit configuration in accordance with changes to said first virtual unit configuration since a last replication to said additional remote virtual unit configuration.

31. One or more processor readable storage devices having processor readable code embodied on said one or more processor readable storage devices, said processor readable code for programming one or more processors to perform a method comprising:
splitting a first member from a first virtual unit configuration;
creating a split virtual unit configuration including said first member;
importing another unit configuration corresponding to a remote virtual unit configuration; and
creating a replication virtual unit configuration including a member corresponding to said other unit configuration.

32. One or more processor readable storage devices according to claim 31, wherein said method further comprises:
copying data from said split virtual unit configuration to said replication virtual unit configuration.

33. One or more processor readable storage devices according to claim 32, wherein:
said step of copying data includes copying selected data from said split virtual unit configuration in accordance with a change log indicating changes to said first virtual unit configuration since a last replication to said remote virtual unit configuration.

34. One or more processor readable storage devices according to claim 31, wherein:
said step of importing said other unit configuration includes exporting said remote virtual unit configuration as said other unit configuration.

35. One or more processor readable storage devices according to claim 31, wherein said method further comprises:
creating a first change log when said first member is split from said first virtual unit configuration, said first change log indicates changes to said first virtual unit configuration since said step of splitting.

36. One or more processor readable storage devices according to claim 35, wherein said method further comprises:
splitting a second member from said first virtual unit configuration subsequent to said step of splitting said first member;
creating a second change log when said second member is split; and
saving a version of said first change log as a first saved change log when said second member is split, said first saved change log indicating changes to said first virtual unit configuration between splitting said first member and said second member.

37. One or more processor readable storage devices according to claim 36, wherein said method further comprises:
replicating said first virtual unit configuration to said remote virtual unit configuration by copying data from said second member to said replication virtual unit configuration in accordance with said changes to said first virtual unit configuration between splitting said first member and said second member as indicated by said first saved change log.

38. The storage switch of claim 1, wherein said one change log is further sized according to the size of a memory within the storage switch for storing the one change log and so as to optimize performance of said storage switch.

39. The method of claim 12, further comprising dynamically sizing said change log according to the size of a memory in which said change log is stored.

40. One or more processor readable storage devices according to claim 15, further comprising dynamically sizing said change log according to the size of a memory in which said change log is stored.

* * * * *